(12) United States Patent
Cuppari et al.

(10) Patent No.: US 12,129,163 B2
(45) Date of Patent: Oct. 29, 2024

(54) REMOTE BEVERAGE SELECTION WITH A BEVERAGE DISPENSER

(71) Applicant: THE COCA-COLA COMPANY, Atlanta, GA (US)

(72) Inventors: Scott Cuppari, Peachtree City, GA (US); Damian James Reec Mycroft, Decatur, GA (US); Arthur G. Rudick, Ormond Beach, FL (US); Rabab Saqib Karori, Suwanee, GA (US); Keith A. Gibson, Atlanta, GA (US); Akhil Karibandi, Marietta, GA (US); John Boyd, Lawrenceville, GA (US); David Mulcahey, Roswell, GA (US); Azam Khan, Alpharetta, GA (US); Mira Uchil, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 554 days.

(21) Appl. No.: 17/416,246

(22) PCT Filed: Dec. 20, 2019

(86) PCT No.: PCT/US2019/067875
§ 371 (c)(1),
(2) Date: Jun. 18, 2021

(87) PCT Pub. No.: WO2020/132457
PCT Pub. Date: Jun. 25, 2020

(65) Prior Publication Data
US 2022/0073335 A1    Mar. 10, 2022

Related U.S. Application Data

(60) Provisional application No. 62/783,108, filed on Dec. 20, 2018.

(51) Int. Cl.
*B67D 1/08* (2006.01)
*B67D 1/12* (2006.01)
(Continued)

(52) U.S. Cl.
CPC ............. *B67D 1/0888* (2013.01); *B67D 1/12* (2013.01); *G06Q 20/18* (2013.01);
(Continued)

(58) Field of Classification Search
CPC ................... B67D 1/0888; B67D 1/12; B67D 2210/00089; G06Q 20/18; G06Q 30/0621;
(Continued)

(56) References Cited

U.S. PATENT DOCUMENTS

| | | |
|---|---|---|
| 7,578,415 B2 | 8/2009 | Ziesel et al. |
| 7,866,509 B2 | 1/2011 | Ziesel |

(Continued)

FOREIGN PATENT DOCUMENTS

| | | |
|---|---|---|
| CN | 105431373 A | 3/2016 |
| JP | 2006277436 A | 10/2006 |

(Continued)

OTHER PUBLICATIONS

International Search Report and Written Opinion. Issued by the International Searching Authority (ISA/KR) in PCT Application No. PCT/US2019/067875 on Apr. 22, 2020, 13 pages.

(Continued)

*Primary Examiner* — Jeremy Carroll
(74) *Attorney, Agent, or Firm* — Meunier Carlin & Curfman LLC

(57) ABSTRACT

A beverage dispenser maintains a profile queue with profile data of "close" consumer mobile computing devices. Each profile in the profile queue maintains one or more beverages previously selected by a consumer, such as favorite beverage (Continued)

(s), mixed or blended beverages, and/or past or future beverage order(s). Each profile in the profile queue is additionally associated with a profile identifier, such as a name, screen name, social media picture, avatar, alphanumeric identifier, other such text or graphics recognizable by a consumer to be associated with their corresponding profile. Upon navigation to an appropriate screen on the beverage dispenser, a display on the beverage dispenser shows the profile identifiers or one or more of the previously selected beverages in the profiles of "close" consumer mobile computing devices. In this way, a consumer is able to quickly access their previously selected beverages without actively manipulating their mobile device.

9 Claims, 14 Drawing Sheets

(51) Int. Cl.
| | | |
|---|---|---|
| *G06Q 20/18* | (2012.01) | |
| *G06Q 30/0601* | (2023.01) | |
| *H04W 4/02* | (2018.01) | |
| *H04W 4/80* | (2018.01) | |
| *H04W 76/11* | (2018.01) | |

(52) U.S. Cl.
CPC ..... *G06Q 30/0621* (2013.01); *G06Q 30/0641* (2013.01); *H04W 4/023* (2013.01); *H04W 4/80* (2018.02); *H04W 76/11* (2018.02); *B67D 2210/00089* (2013.01)

(58) Field of Classification Search
CPC .... G06Q 30/0641; H04W 4/80; H04W 76/11; H04W 4/023
See application file for complete search history.

(56) References Cited

U.S. PATENT DOCUMENTS

| | | |
|---|---|---|
| 9,959,530 B2 | 5/2018 | Geigel et al. |
| 2007/0212468 A1 | 9/2007 | White et al. |
| 2010/0326562 A1 | 12/2010 | Sheehy et al. |
| 2013/0314244 A1* | 11/2013 | Hershberger .......... G01G 17/04 340/870.02 |
| 2014/0114469 A1 | 4/2014 | Givens et al. |
| 2014/0179231 A1 | 6/2014 | Charania et al. |
| 2014/0263454 A1 | 9/2014 | Connerat et al. |
| 2015/0039776 A1 | 2/2015 | Jarnagin, III |
| 2015/0046877 A1 | 2/2015 | Cuppari et al. |
| 2015/0082243 A1 | 3/2015 | Taylor et al. |
| 2016/0092851 A1 | 3/2016 | De Berg Hewett |
| 2018/0162710 A1 | 6/2018 | Moore et al. |
| 2018/0288594 A1 | 10/2018 | Kim |
| 2019/0295058 A1 | 9/2019 | Shinohara et al. |
| 2021/0078847 A1* | 3/2021 | Marten ................... H04W 4/70 |

FOREIGN PATENT DOCUMENTS

| | | | |
|---|---|---|---|
| JP | 2018184196 A | 11/2018 | |
| WO | 2015/103542 A1 | 7/2015 | |
| WO | 2015/167846 A1 | 11/2015 | |
| WO | WO-2017058794 A1 * | 4/2017 | ............. G06Q 20/18 |
| WO | WO-2017112850 A1 * | 6/2017 | ......... G06Q 30/0222 |
| WO | 2018/042668 A1 | 3/2018 | |
| WO | WO-2018044415 A1 * | 3/2018 | .......... A47J 31/4403 |
| WO | WO-2018071685 A1 * | 4/2018 | ........... B67D 1/0878 |

OTHER PUBLICATIONS

Extended European Search Report issued in EP19900659.4, mailed Aug. 11, 2022.
English translation of Chinese Office Action issued in CN Application No. 2019800838289, mailed Jan. 19, 2023.

* cited by examiner

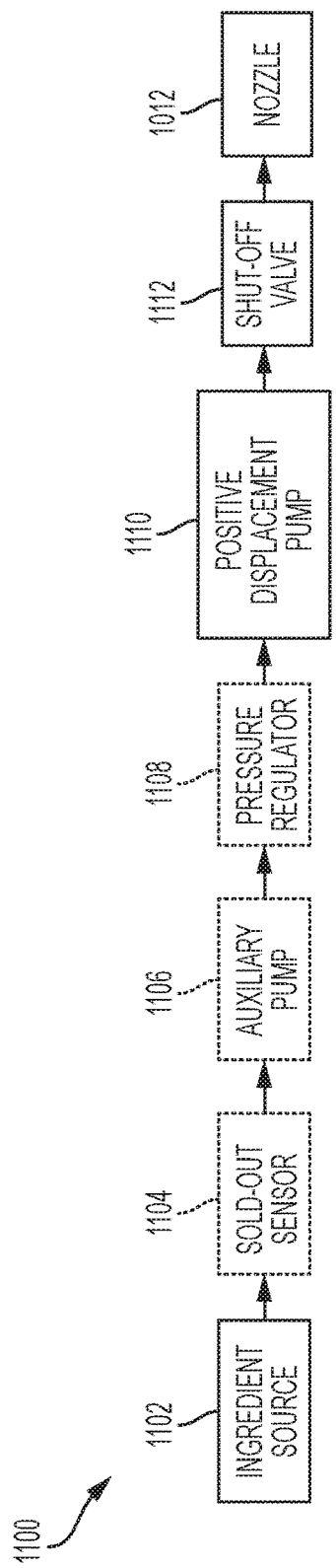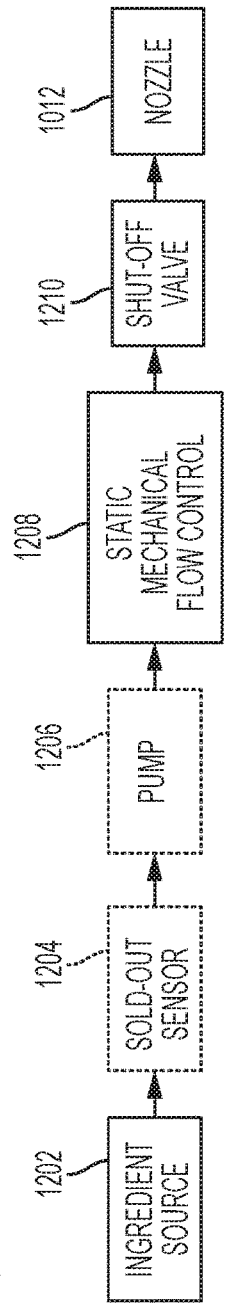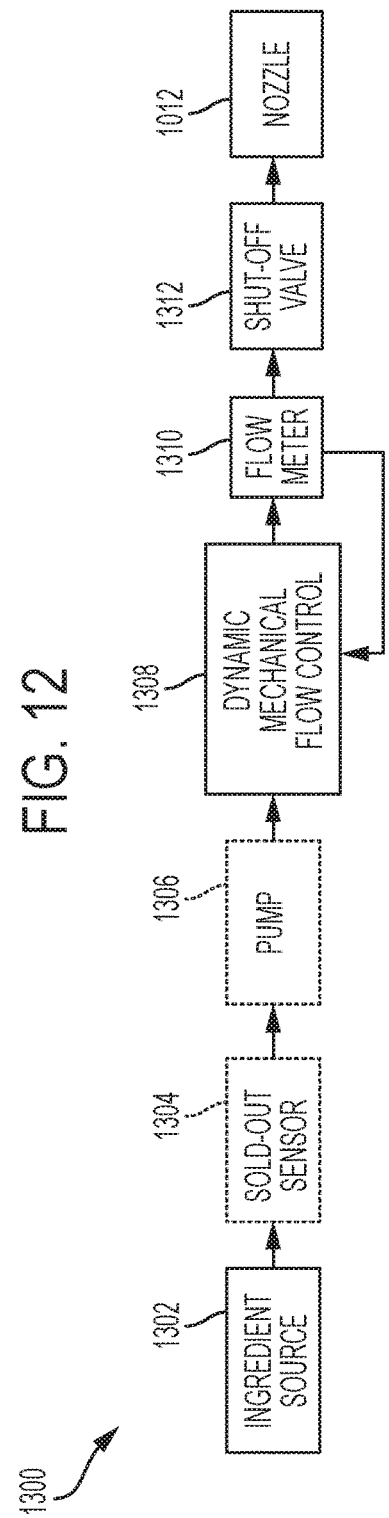
FIG. 11
FIG. 12
FIG. 13

REMOTE BEVERAGE SELECTION WITH A BEVERAGE DISPENSER

CROSS-REFERENCE TO RELATED APPLICATIONS

This application is a national stage application filed under 35 U.S.C. § 371 of PCT/US2019/067875 on Dec. 20, 2019, which claims the benefit of U.S. Provisional Application Ser. No. 62/783,108 filed Dec. 20, 2018, the disclosure of which is expressly incorporated herein by reference.

BACKGROUND

Traditional post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios.

This technology is enabled via cartridges containing the highly concentrated micro-ingredients. The micro-ingredients are mixed with sweeteners and still or sparkling water using precise metering and dosing technologies and dispensed through a nozzle that promotes in-air mixing so as to prevent carry-over. The technology includes a user input for a user to select a desired beverage, customize the beverage if desired, and pour the beverage at the dispenser. These beverages are made from precise recipes to ensure a great tasting beverage regardless of the customization.

Post-mix beverage dispensing systems using micro-ingredients greatly increase a number of beverage options available at a given dispenser. To facilitate ease of navigation of beverage options upon a consumer addressing such a beverage dispenser, the consumer may establish a profile with their preferences. For example, a plurality of favorite beverages or beverage mixes may be configured by the consumer in their profile. The beverage dispenser may load the consumer's profile upon performing a handshake with the consumer's mobile computing device to initiate a personalized interaction with the beverage dispenser. For example, a personalized interaction with the beverage dispenser may take place as described in U.S. 2015/0082243, filed Sep. 15, 2014, entitled "Product Categorization User Interface for a Dispensing Device", hereby incorporated by reference in its entirety.

Because a number of users may establish a line or sequence of users (i.e., a queue) awaiting their turn to interact with a beverage dispenser, a queuing problem may come about whereby it is difficult to determine which consumer is addressing the beverage dispenser at a given time and wishes to establish a personalized interaction with the beverage dispenser. The queueing problem is particularly pronounced when the handshake between the dispenser and the consumer's mobile computing device is performed via wireless communication technologies whose range may encompass multiple consumer mobile computing devices. The queuing problem may be further exacerbated when there are multiple beverage dispensers within wireless communication range.

Prior solutions to the queueing problem have focused on deterministic methods of ascertaining which consumer is addressing a particular beverage dispenser at a given time. For example, a consumer may use their mobile computing device to scan an identifier of the beverage dispenser upon addressing the beverage dispenser, as described in U.S. 2015/0039776, filed Feb. 5, 2015, entitled "Facilitating Individualized User Interaction with an Electronic Device," hereby incorporated by reference in its entirety. Similarly, for a wireless handshake between the beverage dispenser and the consumer's mobile computing device, a range of a wireless beacon that transmits the identifier of the beverage dispenser is limited (e.g., within 1-12 inches of the beverage dispenser) to restrict the possibility of multiple mobile computing devices in the queue or adjacent queues from receiving the signal, as described in U.S. 2018/0288594, filed Sep. 27, 2016, entitled "Dispenser Connectivity", hereby incorporated by reference in its entirety.

SUMMARY

According to a first aspect of the disclosure, a beverage dispenser comprises a user interface configured to display profile data from a plurality of profiles associated with mobile devices within a predetermined range of the beverage dispenser. The profile data comprises at least one previously selected beverage. The user interface is configured to receive a selection of a beverage from among the at least one previously selected beverage associated with one of the profiles. The beverage dispenser also comprises a nozzle configured to dispense the beverage selected on the user interface. The beverage dispenser also comprises a plurality of pumping or metering devices, each configured to supply a beverage ingredient from an ingredient source to the nozzle. The beverage dispenser also comprises a controller configured to operate one or more of the plurality of pumping or metering devices to dispense the beverage selected on the user interface.

In some implementations of the first aspect of the disclosure, the beverage dispenser further comprises a wireless communication device configured to broadcast a device identifier within the predetermined range of the beverage dispenser.

In some implementations of the first aspect of the disclosure, the device identifier is a unique identifier of the beverage dispenser.

In some implementations of the first aspect of the disclosure, the beverage dispenser further comprises a memory comprising a profile queue of the plurality of profiles within the predetermined range of the beverage dispenser.

In some implementations of the first aspect of the disclosure, the memory further comprises a database of regional profiles comprising a second plurality of profiles within a second range of the beverage dispenser, wherein the second range is greater than the predetermined range.

In some implementations of the first aspect of the disclosure, a profile from the second plurality of profiles is added to the profile queue upon a mobile device associated with the profile moving from a range within the second range to a range within the predetermined range.

In some implementations of the first aspect of the disclosure, the beverage dispenser further comprises a second wireless communication device configured to broadcast a second device identifier within the second range of the beverage dispenser.

In some implementations of the first aspect of the disclosure, the second device identifier is common to a plurality of beverage dispensers.

In some implementations of the first aspect of the disclosure, the beverage dispenser further comprises a modem configured to receive a notification that a mobile device is within the predetermined range of the beverage dispenser, wherein, in response to the notification, a profile associated with the mobile device is included in the plurality of profiles.

In some implementations of the first aspect of the disclosure, the modem is further configured to receive a second notification that the mobile device is within a second range of the beverage dispenser, wherein the second range is greater than the predetermined range.

In some implementations of the first aspect of the disclosure, the modem is further configured to receive the profile associated with the mobile device in response to the second notification.

In some implementations of the first aspect of the disclosure, the notification and the second notification are received from a server.

In some implementations of the first aspect of the disclosure, the profile data comprises a profile identifier from each of the plurality of profiles, wherein the profile identifier is selected from the group of profile identifiers consisting of: a name; a screen name; a social media picture; an avatar; and alphanumeric identifier.

According to a second aspect of the disclosure, a kiosk comprises a user interface configured to display profile data from a plurality of profiles associated with mobile devices within a predetermined range of the kiosk. The profile data comprises at least one previously selected option for the kiosk. The user interface is configured to receive a selection of an option from among the at least one previously selected option associated with one of the profiles. The kiosk also comprises a controller configured to operate one or more functions of the kiosk in response to the selection of the option on the user interface.

In some implementations of the second aspect of the disclosure, the kiosk further comprises a wireless communication device configured to broadcast a device identifier within the predetermined range of the kiosk. The device identifier is a unique identifier of the beverage dispenser.

In some implementations of the second aspect of the disclosure, the kiosk further comprises a memory comprising a profile queue of the plurality of profiles within the predetermined range of the kiosk. The memory further comprises a database of regional profiles comprising a second plurality of profiles within a second range of the beverage dispenser. The second range is greater than the predetermined range.

According to a third aspect of the disclosure, a method comprises determining, by an application that maintains a profile on a mobile device, that the mobile device is within a first range of a kiosk and responsively sending a first communication associated with the profile. The profile comprises at least one previously selected option for the kiosk. The method also comprises, in response to the first communication, receiving the profile associated with the mobile device by the kiosk and maintaining the received profile in a database of regional profiles on the kiosk. The method also comprises determining, by the application on the mobile, that the mobile device is within a second range of the kiosk, wherein the second range is less than the first range, and responsively sending a second communication associated with the profile. The method also comprises, in response to the second communication, adding the profile to a profile queue on the kiosk from the database of regional profiles. The method also comprises displaying, by the kiosk, profile data from a plurality of profiles in the profile queue.

In some implementations of the third aspect of the disclosure, the application on the mobile device determines that the mobile device is within the second range of the kiosk upon receiving a broadcast from the kiosk of a device identifier associated with the kiosk.

In some implementations of the third aspect of the disclosure, the device identifier is unique to the kiosk.

In some implementations of the third aspect of the disclosure, the application on the mobile device determines that the mobile device is within the first range of the kiosk upon receiving a broadcast from the kiosk of a second device identifier associated with the kiosk.

In some implementations of the third aspect of the disclosure, the second device identifier is associated with a plurality of compatible kiosks.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 11 illustrates an exemplary fluidic circuit with a positive displacement pump suitable for implementing the several embodiments of the disclosure.

FIG. 12 illustrates an exemplary fluidic circuit with a static mechanical flow control suitable for implementing the several embodiments of the disclosure.

FIG. 13 illustrates an exemplary fluidic circuit with a dynamic mechanical flow control and flow meter suitable for implementing the several embodiments of the disclosure.

DETAILED DESCRIPTION

Figure 1:
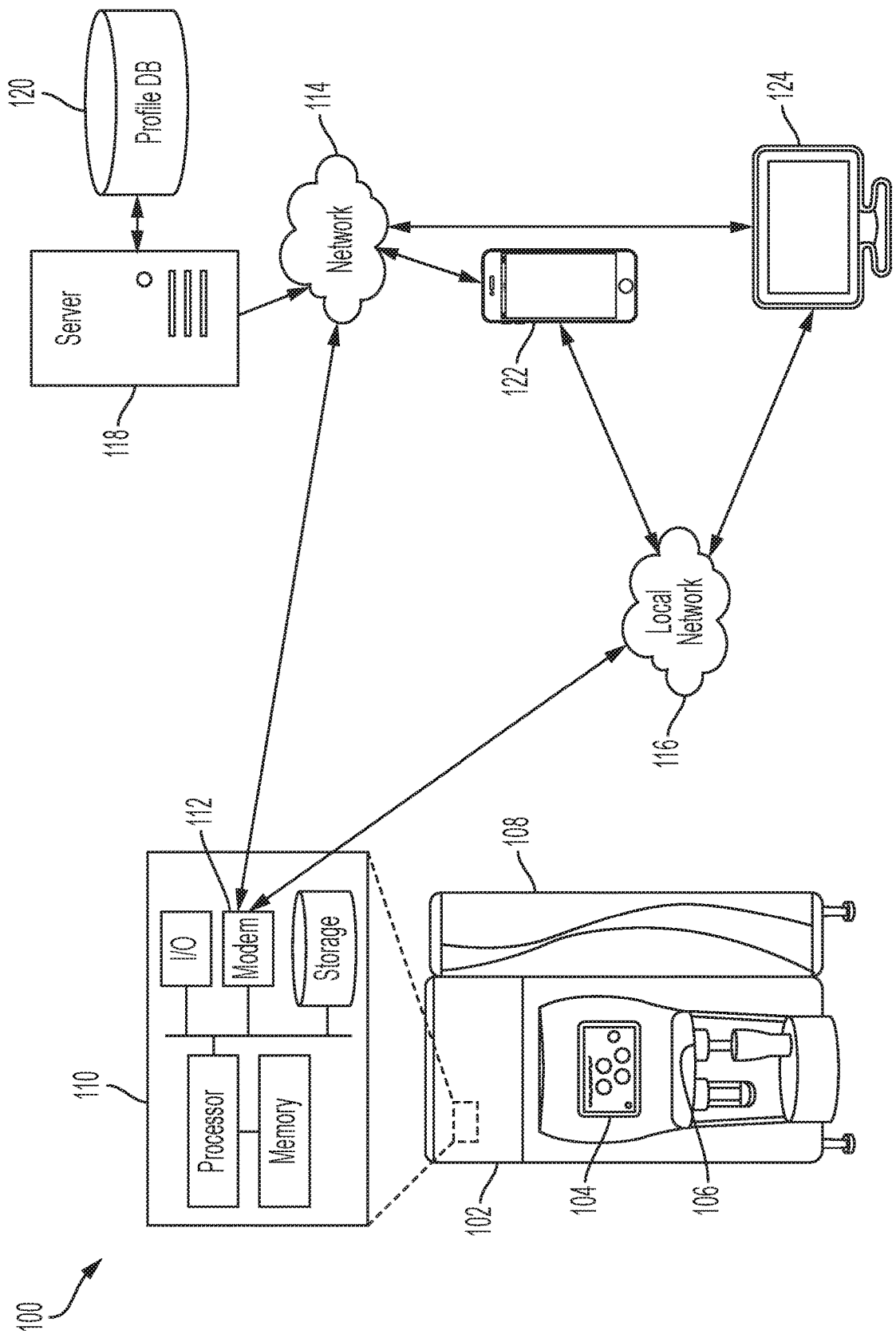
FIG. 1 illustrates an exemplary system block diagram for pre-loading a selection of a beverage on a beverage dispenser according to various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A", "B", and/or "C" means "A", or "B", or "C", or "A and B", or "A and C", "B and C" or "A and B and C".

In contrast to deterministic methods of ascertaining which consumer is addressing a particular beverage dispenser at a given time, a beverage dispenser of the pending disclosure maintains a profile queue with profile data of "close" consumer mobile computing devices. Each profile in the profile queue maintains one or more beverages previously selected by a consumer, such as favorite beverage(s) for the consumer, mixed or blended beverages created or stored by the consumer in their profile, and/or past or future beverage order(s). Each profile in the profile queue is additionally associated with a profile identifier, such as a name, screen name, social media picture, avatar, alphanumeric identifier, other such text or graphics recognizable by a consumer to be associated with their corresponding profile. Upon navigation to an appropriate screen on the beverage dispenser, a display on the beverage dispenser shows the profile identifiers or one or more of the previously selected beverages in the profiles of "close" consumer mobile computing devices. In this way, a consumer is able to quickly access their previously selected beverages without actively manipulating their mobile device to facilitate a handshake with the beverage dispenser to supply profile data.

In some implementations, a consumer's profile may be password protected. Upon selecting a profile identifier, the beverage dispenser may request a password before displaying previously selected beverages in the consumer's profile.

The beverage dispenser comprises one or more wireless communication devices, each configured to broadcast one or more dispenser identifiers of the beverage dispenser. For example, a dispenser identifier may be an identifier common to a plurality of beverage dispensers or all compatible beverage dispensers. Another dispenser identifier may uniquely identify a particular beverage dispenser. A mobile application installed on the consumer's mobile device is configured to receive the one or more dispenser identifiers and send a message to a server with the received dispenser identifier(s) as well as a profile identifier associated with the consumer's profile. In turn, the server is configured to retrieve the consumer's profile associated with the received profile identifier from a profile database and communicate the retrieved consumer profile to all of the beverage dispensers associated with the received dispenser identifier(s).

In some implementations, the beverage dispenser comprises a plurality of wireless communication devices that each broadcast a dispenser identifier at a different communication range. A first wireless communication device may broadcast a first dispenser identifier at a first range from the beverage dispenser. For example, the first wireless communication device may be a WiFi modem with a communication range of around 100-300 feet. A second wireless communication device may broadcast a second dispenser identifier at a second range from the beverage dispenser. For example, the second wireless communication device may be a Bluetooth beacon with a communication range of around 10-20 feet.

Upon the mobile application installed on the consumer's mobile device reporting to the server that the first dispenser identifier has been received, the server may supply the consumer's profile to all beverage dispensers within a region. For example, the server may supply the consumer's profile to all the beverage dispensers within a particular outlet or all beverage dispensers within a predetermined distance of the consumer's mobile device. Accordingly, the beverage dispensers each maintain a database of regional profiles-profiles of consumer's within a given region (e.g., outlet or predetermined distance). Likewise, upon the mobile application no longer receiving the first dispenser identifier within a threshold time period or otherwise leaving the region, the consumer's profile is removed from the database of regional profiles.

Upon the mobile application reporting to the server that the second dispenser identifier has been received, the server may send a notification with the profile identifier associated with the consumer to the beverage dispenser associated with the second dispenser identifier. Upon receiving the notification, the beverage dispenser populates the profile queue with the corresponding profile from the database of regional profiles. Likewise, upon the mobile application no longer receiving the second dispenser identifier within a threshold time period, another notification may be sent through the server to remove the consumer's profile from the profile queue. When multiple beverage dispensers are located within the first and second range, the consumer's profile will be loaded into the profile queue of each of the in-range beverage dispensers.

In some implementations, as opposed to using multiple wireless communication devices configured to broadcast information at different ranges, one or more properties of a wireless communication (e.g., signal strength) may be evaluated to determine how close a consumer is to one or more beverage dispensers. Upon a determination that a consumer is within a predetermined distance of a beverage dispenser (e.g., signal strength is greater than a threshold level), the consumer's profile may be loaded onto the beverage dispenser as described above. Likewise, upon a determination that a consumer is within a second predetermined distance of the beverage dispenser (e.g., signal strength is greater than a second threshold), the consumer's profile may be added to the profile queue as described above. Other variations are contemplated by this disclosure.

By pre-loading a consumer's profile on the beverage dispenser before they address the beverage dispenser, the consumer may simply navigate to their profile to select a desired beverage without having to facilitate the handshake between the beverage dispenser and their mobile device. Therefore, the consumer may participate in a personalized interaction with the beverage dispenser while keeping their phone in their pocket, purse, or bag as opposed to in their hand.

While described herein with particular examples focused on facilitating personalized interactions with a beverage dispenser by pre-loading a consumer's profile on the beverage dispenser before the consumer addresses the beverage dispenser, the disclosure is not so limited. For example, the same techniques and technologies may be used with facilitating pre-loading a consumer's profile on any kiosk before the consumer addresses the kiosk to facilitate an interaction on the kiosk based on the consumer's profile. Other such kiosks may include an information kiosk, point of sale terminal, vending machine, or cooler, for example.

FIG. 1 illustrates an exemplary system 100 for pre-loading a selection of a beverage on a beverage dispenser 102 according to various embodiments of the disclosure. The beverage dispenser 102 includes a user interface 104, such as a touchscreen display for selecting a desired beverage to be poured from a nozzle 106 on the beverage dispenser 102. In some implementations, the beverage dispenser 102 includes an ingredient compartment 108 for storing a plurality of beverage ingredients, such as beverage micro-ingredients. One or more additional beverage ingredients (not shown) may be supplied to the beverage dispenser 102 from a remote location, such as a back room. The additional beverage ingredients may comprise a sweetener, flavored syrup, carbon dioxide, water, carbonated water, and/or other beverage ingredients. A pump and/or metering device (e.g., positive displacement pump, static mechanical flow control valve, dynamic mechanical flow control valve, shut-off valve, etc.) is coupled between each of the beverage ingredients and the nozzle 106 for controlling an amount, rate, or ratio of beverage ingredients dispensed for dispensing a selected beverage, as described in more detail below.

The beverage dispenser comprises a control architecture 110 comprising a modem 112 for communicating with external devices. While shown as a single component, the modem 112 may comprise a plurality of modems for communicating with different communication standards. For example, the modem 112 may comprise an ethernet card and/or a cellular modem for connecting (e.g., via a local gateway, not shown) to a wide area network (WAN) 114, such as the internet. The modem 112 may additionally comprise a local wireless communications modem for supporting communication over a local network 116 using one or more local wireless communication standards, such as WiFi, WiFi Direct, Zigbee, Z-Wave, Bluetooth, or Bluetooth Low Energy (BLE) communications. In addition to the modem 112, the beverage dispenser 102 may comprise a beacon (not shown), such as a BLE beacon for broadcasting a unique identifier associated with the beverage dispenser 102.

The beverage dispenser 102 is configured to utilize the modem 112 for communicating over the WAN 114 with a remote server 118. The beverage dispenser 102 is configured to receive consumer profiles maintained on a profile database 120 and provided by the server 118. The beverage dispenser 102 is also configured to receive one or more notifications from the server 118 regarding how close a consumer mobile device 122 is to the beverage dispenser 102. The mobile device 122 may be a smartphone, smartwatch, personal digital assistant, or any other mobile computing device carried by a consumer. The beverage dispenser 102 is also configured to utilize the modem 112 to communicate locally with the consumer mobile device 122 or a local point-of-sale (POS) device 124.

The POS device 124 may be located in the same outlet (e.g., restaurant, convenience store, etc.) as the beverage dispenser 124. For example, the POS device 124 may be a self-service order entry system for receiving consumer orders at the outlet. The POS device 124 facilitates consumers to select a desired beverage on the POS device 124 when placing an order, prior to addressing the beverage dispenser 102. The POS device 124 is in communication with the beverage dispenser 102 via the local network 116, such as via a wired or wireless communication.

Upon addressing the beverage dispenser 102, a consumer may navigate to an "Orders" menu on the user interface 104 to display and select their previously selected beverage. In this way, the consumer may spend less time addressing the beverage dispenser to decide on which beverage to select because the beverage selection decision will have already been made at the POS device 124. The "Orders" menu may be populated with a list of a threshold number of most recently received beverage orders selected on the POS device 124. For example, the "Orders" menu may be populated with the 5-10 most recently received beverage orders from the POS device 124. As an additional beverage selection above the threshold number is received from the POS device 124, the list of beverages in the "Orders" menu may be updated to remove an oldest beverage selection and add the additional beverage selection.

In some implementations, a separate POS device 124 may be in communication with each beverage dispenser 102 in a given outlet to facilitate populating the "Orders" menu. In some implementations, a POS device 124 may be associated with more than one beverage dispenser 102.

The mobile device 122 comprises a mobile application compatible with facilitating personalized interactions with the beverage dispenser 102. The mobile device 122 facilitates a consumer to define a profile with one or more pre-selected beverages. For example, the mobile application is configured to enable a consumer to define a profile with pre-selected favorite beverage(s), created or stored mixed or blended beverages, and/or future beverage order(s). The mobile application may maintain a local copy of the profile on the mobile device 122 and/or maintain a remote copy of the profile on the profile database 120 via the server 118. The mobile application on the mobile device 122 facilitates loading the profile on the beverage dispenser 102 via a direct or indirect handshake operation, described in more detail with reference to FIGS. 2 and 3 below. In some implementations, the mobile application on the mobile device 122 may need to be activated, opened, or otherwise triggered to run prior to performing the handshake operations described below. In some implementations, the mobile application on the mobile device 122 may run in the background and await a triggering event, such as upon determining that the mobile device 122 is within the first and/or second range, as described below.

The mobile application on the mobile device 122 may be configured to establish a direct communication session with the beverage dispenser 102 for providing the profile to the beverage dispenser as described in U.S. 2018/0288594, filed Sep. 27, 2016, entitled "Dispenser Connectivity", hereby incorporated by reference in its entirety. Alternatively or additionally, the mobile application on the mobile device 122 may be configured to supply the profile to the beverage dispenser 102 via an indirect communication session with the server 118, similar to that described in U.S. 2015/0039776, filed Feb. 5, 2015, entitled "Facilitating Individualized User Interaction with an Electronic Device," hereby incorporated by reference in its entirety.

In general, upon the mobile device 122 being located within a region (e.g., within a first range of the beverage dispenser 102 or within an outlet in which the beverage dispenser 102 is located) of the beverage dispenser 102, the mobile application on the mobile device 122 facilitates loading (directly or indirectly) the profile on the beverage dispenser 102. Therefore, the profile is loaded on the beverage dispenser 102 and stored in a database of regional profiles before a consumer addresses the beverage dispenser 102. Because there may be many such consumers within the region, it may not be desirable to allow all of the profiles in the region to be displayed or accessed via the user interface 104. Otherwise, a consumer may need to navigate through a large number of profiles to locate their profile on the beverage dispenser 102.

Therefore, the profiles that are maintained in the database of regional profiles are filtered in a profile queue to include profiles of mobile devices 122 located "close" to the beverage dispenser 102 (e.g., within a second range that is smaller than the first range) or otherwise include a predetermined number of the closest mobile devices 122 to the beverage dispenser 102. Upon addressing the beverage dispenser 102, a consumer may navigate the user interface 104 to view the profiles or data therefrom of the profiles in the profile queue. In some implementations, the profiles in the profile queue may be password protected. Upon receiving a selection of a profile identifier, the beverage dispenser 102 may request a password before displaying previously selected beverages in the selected profile.

Figure 2:
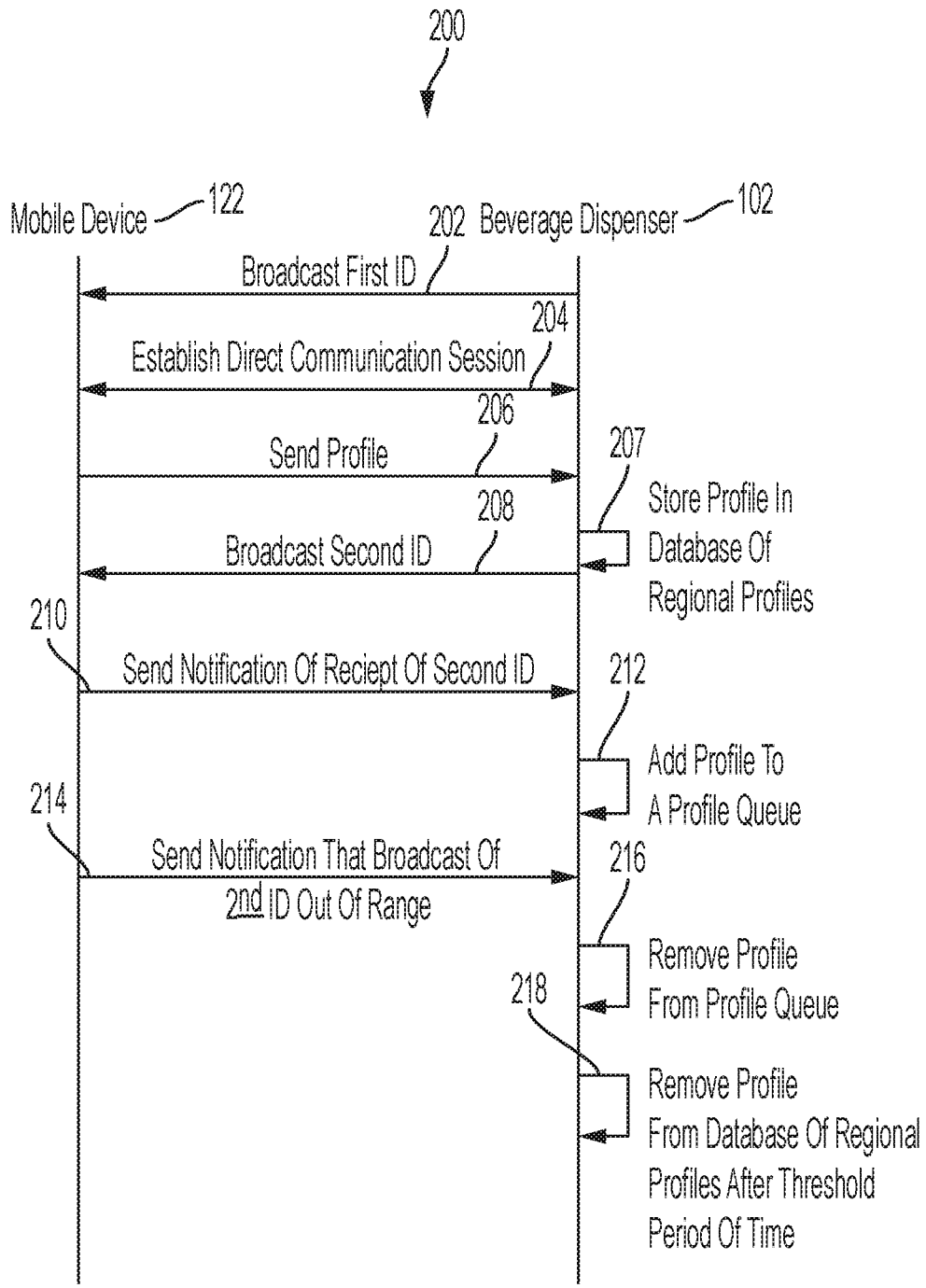
FIG. 2 illustrates an exemplary entity sequence diagram for a direct communication session between a mobile device and a beverage dispenser according to various embodiments of the disclosure.

FIG. 2 illustrates an exemplary entity sequence diagram for a direct communication session 200 between the mobile device 122 and the beverage dispenser 102 according to various embodiments of the disclosure. In the implementation shown in FIG. 2, the beverage dispenser 102 comprises a first wireless communication device configured to broadcast a first device ID and a second wireless communication device configured to broadcast a second device ID.

For example, the first wireless communication device may be a WiFi modem or other such moderate range (e.g., up to 100-300 feet) wireless communication device. The first device ID may be common to common to a plurality of beverage dispensers (e.g., all dispensers in a given outlet) or all compatible beverage dispensers. For example, the first device ID is a common SSID of the WiFi modem that is recognizable by the mobile application on the mobile device 122. The second wireless communication device may be a Bluetooth beacon configured with a shorter range (e.g., 1 to 20 feet) than the first wireless communication device. The second device ID is a unique ID of the beverage dispenser 102.

At 202, the mobile device 122 receives the first device ID broadcast from the beverage dispenser 102 from the first wireless communication device. For example, upon a consumer entering an outlet with the beverage dispenser 102, the mobile device 122 is positioned within a first range to receive the first device ID. The first range may be up to 100-300 feet away from the beverage dispenser 102. At 204, the mobile application on the mobile device 122 recognizes the first device ID and establishes a direct communication session with the beverage dispenser 102. For example, the mobile device 122 and the beverage dispenser may establish a direct communication session as described in more detail in U.S. 2018/0288594, filed Sep. 27, 2016, entitled "Dispenser Connectivity", hereby incorporated by reference.

At 206, the mobile application on the mobile device 122 sends the profile to the beverage dispenser 102 via the direct communication session established at 204. In some implementations, upon completion of sending the profile to the beverage dispenser 102, the mobile device 122 may end the direct communication session between the mobile device 122 and the beverage dispenser. In an outlet with more than one beverage dispenser 102 present, the mobile application on the mobile device 122 sends the profile to each beverage dispenser in the outlet via the direct communication session. In some implementations, the mobile device 122 may serially establish a direct communication session with each of the beverage dispensers in the outlet for providing the profile.

At 207, the beverage dispenser 102 stores the received profile in a database of regional profiles maintained on the beverage dispenser 102. The received profile is indexed in the database of regional profiles with an associated profile identifier that uniquely identifies the profile. For example, the profile identifier may be provided by the mobile application with the profile or derived from information provided by the mobile application or included in the profile. The database of regional profiles includes all profiles received from mobile devices with the mobile application within the first range (e.g., all of the profiles of mobile devices located within an outlet). Accordingly, the beverage dispenser 102 is configured to pre-fetch profiles of consumers that are located in a given region (e.g., within the first range, within a given outlet, etc.) before the consumers approach the beverage dispenser to engage in a dispensing operation.

A 208, the mobile device 122 receives the second device ID broadcast from the beverage dispenser 102 from the second wireless communication device. For example, upon a consumer approaching the beverage dispenser 102, the mobile device 122 is positioned within a second range of the beverage dispenser 102 to receive the second device ID. The second range is less than the first range. The second range may be within 1-15 feet away from the beverage dispenser 102, for example. For example, a power level of the second wireless communication device is configured to limit a range at which the second device ID is broadcast to be within the second range. The second range may be configured to include a plurality of consumers queued for use of the beverage dispenser 102 or at adjacent beverage dispensers.

At 210, the mobile device 122 sends a first notification to the beverage dispenser 102 indicating that the mobile device 122 has received the second device ID. Upon receiving the first notification, the beverage dispenser 102 is made aware that the mobile device 122 is within the second range of the beverage dispenser 102. The first notification includes an identifier of the profile sent to the beverage dispenser 102 at 206.

At 212, the beverage dispenser 102 loads the profile corresponding to the identifier from the database of regional profiles to a profile queue maintained on the beverage dispenser 102. For example, the beverage dispenser 102 may move or copy the profile from the database of regional profiles to the profile queue or maintain a reference or pointer in the profile queue to the profile maintained in the database of regional profiles. Accordingly, a consumer is able to access the profile or data contained in the profile via the user interface 104 on the beverage dispenser to be able to select from one or more previously selected beverages, as described in more detail below.

At 214, the mobile device 122 no longer receives the second device ID broadcast from the beverage dispenser 102. For example, the mobile device 122 may be located outside of the second range. Accordingly, the mobile device 122 sends a second notification to the beverage dispenser 102 indicating that the mobile device 122 is no longer receiving the second device ID.

At 216, upon the beverage dispenser 102 receiving the second notification that the mobile device 122 is no longer receiving the second device ID, the beverage dispenser 102 removes the profile from the profile queue. Likewise, at 218, the profile is removed from the database of regional profiles after a predetermined time period or other such removal criteria (e.g., being located outside of a geofenced area, no longer being within the first range, etc.).

Variations and modification of the direct communication session 200 are contemplated by this disclosure. For example, in some implementations, rather than having multiple wireless communication devices on the beverage dispenser 102, the mobile device 122 may monitor a signal strength of a single wireless communication device on the beverage dispenser 102 to determine when the mobile device 122 is within the first and second range. For example, the mobile device 122 may be determined to be within the first range upon receiving a communication from the single wireless communication device and within the second range upon a signal strength of the communication exceeding a threshold signal strength value.

In some implementations, rather than performing 214, 216, and 218, the profile queue and the database of regional profiles may simply be implemented as ring-buffers of differing sizes. For example, the database of regional profiles may maintain up to a first predetermined number of most recently received profiles (e.g., up to 10, 50, 100, 1000, etc.). Upon receiving an additional profile beyond the first predetermined number of profiles, the database of regional profiles may overwrite the oldest profile. Likewise, the profile queue may maintain up to a second predetermined number of most recently received profiles (e.g., 1, 3, 5, 10) that is less than the first predetermined number of profiles. Upon receiving an additional profile beyond the second predetermined number of profiles, the profile queue may overwrite the oldest profile.

Figure 3:
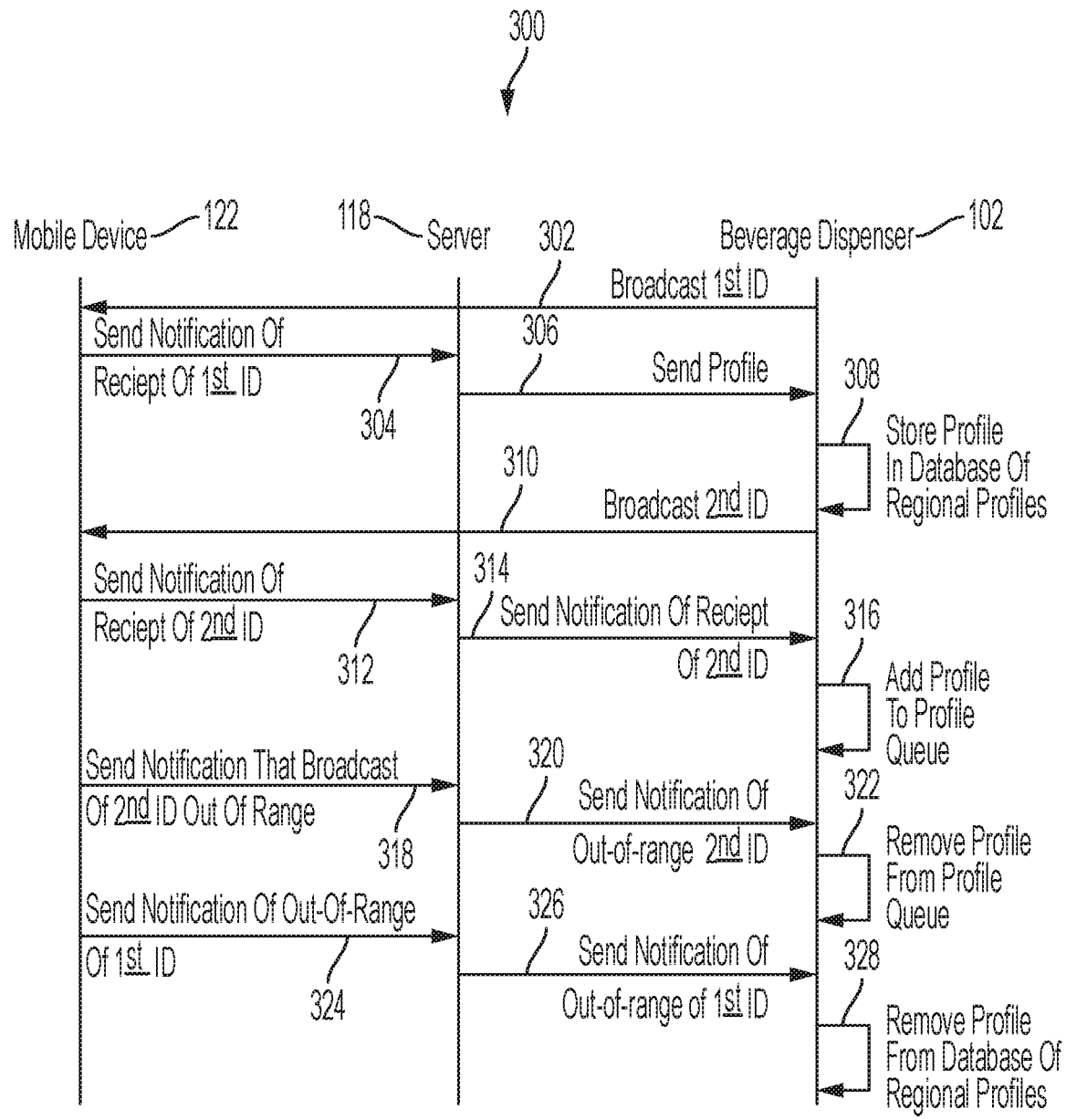
FIG. 3 illustrates an exemplary entity sequence diagram for an indirect communication session between a mobile device, server, and a beverage dispenser according to various embodiments of the disclosure.

FIG. 3 illustrates an exemplary entity sequence diagram 300 for an indirect communication session between the mobile device 102, the server 118, and the beverage dispenser 102 according to various embodiments of the disclosure. The sequence diagram 300 is implemented substantially the same as the sequence diagram 200 described above, but with the server 118 serving as an intermediary to facilitate communication between the mobile device 122 and the beverage dispenser 102. As with FIG. 2, in the implementation shown in FIG. 3, the beverage dispenser 102 comprises a first wireless communication device configured to broadcast a first device ID and a second wireless communication device configured to broadcast a second device ID.

Similar to 202 described above, at 302, the mobile device 122 receives the first device ID broadcast from the beverage dispenser 102 from the first wireless communication device. For example, upon a consumer entering an outlet with the beverage dispenser 102, the mobile device 122 is positioned within a first range to receive the first device ID.

At 304, rather than directly communicating with the beverage dispenser 102, the mobile application on the mobile device 122 recognizes the first device ID and sends a first notification to the server 118. The first notification may include the first device ID and a profile ID associated with the mobile application on the mobile device 122. Therefore the first notification alerts the server 118 that the mobile device 122 is located in a region (e.g., outlet or predetermined distance) of a compatible beverage dispenser 102. The server 118 uses the profile ID to retrieve a profile associated with the mobile device 122 from the profile database 120. In some implementations, the profile ID received from the mobile device 122 is an identifier associated with the mobile device 122 (e.g., MAC address, UDID, phone number, etc.) which the server 118 may use as a key for locating the profile in the profile database 120.

In some implementations, the first device ID may be common to all compatible beverage dispensers 102. In such cases, the first notification may additionally include a location of the mobile device 122. In some implementations, the first notification may not include the first device ID, but may instead include the location of the mobile device 122. The server 118 may then use the location of the mobile device 122 to determine to which beverage dispensers to send the retrieved profile (e.g., all beverage dispensers within a predetermined region or distance from the mobile device 122, all beverage dispensers in outlets within a predetermined distance from the mobile device 122, etc.). In some implementations, the first device ID may be common to a plurality of compatible beverage dispensers 102, but less than all of the compatible beverage dispensers. In such cases, the server 118 may then determine to send the retrieved profile to all of the plurality of compatible beverage dispensers 102. In some implementations, the first device ID may be common to all compatible beverage dispensers 102 at a given outlet or region. In such cases, the server 118 may then determine to send the retrieved profile to all of the beverage dispensers 102 in the outlet or region. Other variations are contemplated by this disclosure.

At 306, the server 118 sends the retrieved profile to the determined beverage dispensers (e.g., all the beverage dispensers in the outlet where the mobile device 122 is located). At 308, each of the beverage dispenser that receive the profile store the received profile in a database of regional profiled maintained on the respective beverage dispenser 102, similar to 207 described above.

At 310, the mobile device 122 receives the second device ID broadcast from the beverage dispenser 102 from the second wireless communication device. For example, upon a consumer approaching the beverage dispenser 102, the mobile device 122 is positioned within a second range of the beverage dispenser 102 to receive the second device ID. The second device ID is a unique ID of the beverage dispenser 102.

At 312, the mobile application on the mobile device 122 recognizes the second device ID and sends a second notification to the server 118. The second notification may include the second device ID and the profile ID associated with the mobile application on the mobile device 122. The server 118 uses the second device ID to determine to which beverage dispenser 102 the mobile device 122 is "close" (e.g., within the second range of the beverage dispenser 102). The second range is less than the first range. The second range may be within 1-15 feet away from the beverage dispenser 102, for example. For example, a power level of the second wireless communication device is configured to limit a range at which the second device ID is broadcast to be within the second range. The second range may be configured to include a plurality of consumers queued for use of the beverage dispenser 102 or at adjacent beverage dispensers.

For outlets with multiple beverage dispensers 102 in close proximity to each other, the mobile device 122 may receive the second device ID from a plurality of the beverage dispensers 102. Accordingly, the features of 310-316 may be repeated for each instance of the mobile device 122 receiving a new second device ID from the plurality of the beverage dispensers.

At 314, the server 118 sends a third notification to the beverage dispenser 102 indicating that the mobile device 122 has received the second device ID. Upon receiving the third notification, the beverage dispenser 102 is made aware that the mobile device 122 is within the second range of the beverage dispenser 102. The third notification includes the profile ID of the profile sent to the beverage dispenser 102 at 306.

As described above at 212, at 316, the beverage dispenser 102 loads the profile corresponding to the identifier from the database of regional profiles to a profile queue maintained on the beverage dispenser 102.

At 318, the mobile device 122 no longer receives the second device ID broadcast from the beverage dispenser 102. For example, the mobile device 122 may be located outside of the second range. Accordingly, the mobile device 122 sends a fourth notification to the server 118 indicating that the mobile device 122 is no longer receiving the second device ID. The fourth notification may include the second device ID and the profile ID.

At 320, the server 118 sends a fifth notification to the beverage dispenser 102 associated with the second device ID received in the fourth notification indicating that the mobile device 122 is out of range of the second wireless communication device. Accordingly, at 322, the beverage dispenser 102 removes the profile associated with the profile ID from the profile queue.

At 324, the mobile device 122 no longer receives the first device ID broadcast from the beverage dispenser 102. For example, the mobile device 122 may be located outside of the first range (e.g., no longer in the outlet with the beverage dispenser 102). Accordingly, the mobile device 122 sends a sixth notification to the server 118 indicating that the mobile device 122 is no longer receiving the first device ID. The sixth notification may include the first device ID and the profile ID. At 326, the server 118 sends a seventh notification to the beverage dispensers determined at 304 that the mobile device is no longer receiving the first device ID. Accordingly, the beverage dispenser that receive the seventh notification will remove the profile associated with the profile ID from the database of regional profiles.

Variations and modification of the direct communication session 300 are contemplated by this disclosure. For example, in some implementations, rather than having multiple wireless communication devices on the beverage dispenser 102, the mobile device 122 may monitor a signal strength of a single wireless communication device on the beverage dispenser 102 to determine when the mobile device 122 is within the first and second range. For example, the mobile device 122 may be determined to be within the first range upon receiving a communication from the single wireless communication device and within the second range upon a signal strength of the communication exceeding a threshold signal strength value.

In some implementations, the beverage dispenser 102 may not include the first wireless device for broadcasting the first device ID. Rather, the mobile application on the mobile device 122 may monitor a location of the mobile device 122 to determine whether the mobile device is in a pre-defined region. For example, a geofence region surrounding an outlet with compatible beverage dispensers 102 may be pre-defined for triggering the mobile device 122 to send the first notification to the server 118.

In some implementations, rather than performing 318-328, the profile queue and the database of regional profiles may simply be implemented as ring-buffers of differing sizes. For example, the database of regional profiles may maintain up to a first predetermined number of most recently received profiles (e.g., up to 10, 50, 100, 1000, etc.). Upon receiving an additional profile beyond the first predetermined number of profiles, the database of regional profiles may overwrite the oldest profile. Likewise, the profile queue may maintain up to a second predetermined number of most recently received profiles (e.g., 1, 3, 5, 10) that is less than the first predetermined number of profiles. Upon receiving an additional profile beyond the second predetermined number of profiles, the profile queue may overwrite the oldest profile.

In some implementations of the examples described above, rather than separately maintaining a database of regional profiles and a profile queue, the database of regional profiles may be arranged in order of how far away mobile devices 122 are to the beverage dispenser 102. A predetermined number of the profiles in the arranged database of regional profiles may form the profile queue.

For example, the database of regional profiles may be dynamically arranged in order based on a detected signal strength of the second device ID by the mobile devices 122 from strongest signal to weakest signal. A predetermined number of the profiles in the database of regional profiles with the strongest signal strength or strongest signal strength that exceed a threshold signal strength may comprise the profile queue (e.g., the top 5 signal strengths in the database of regional profiles). In another example, the database of regional profiles may be arranged first based on those mobile devices 122 that are within the second range and second based on how recently those mobile devices 122 were detected to be within the second range. A predetermined number of the profiles in the database of regional profiles associated with mobile devices 122 most recently detected to be within the second range may comprise the profile queue. Other variations to the arrangement of profiles in the database of regional profiles are contemplated by this disclosure.

In some implementations, the beverage dispenser 102 may additionally comprise a camera (not shown) configured to capture an image of a field of view opposite from the user interface 104. Accordingly, the camera is configured to capture an image of a consumer addressing the beverage dispenser 102. In such implementations, a consumer may use the mobile application on the mobile device 122 to select a beverage prior to addressing the beverage dispenser 102. In conjunction with selecting the beverage, the mobile application on the mobile device 122 may be used to capture an image of an identifiable object associated with the consumer. For example, the identifiable object may be of the shirt that the consumer is wearing, an accessory carried by the consumer, or some other identifiable object associated with the consumer.

Upon performing a handshake with the beverage dispenser 102 as described above in FIGS. 2 and 3, in addition to the profile, the mobile device 122 may communicate the captured image (e.g., to the server 118 or directly to the beverage dispenser 102). Upon the consumer addressing the beverage dispenser 102, the beverage dispenser may use the camera to recognize the identifiable object associated with the consumer and automatically load the corresponding profile or previously selected beverage. Other variations are contemplated by this disclosure.

Figure 4:
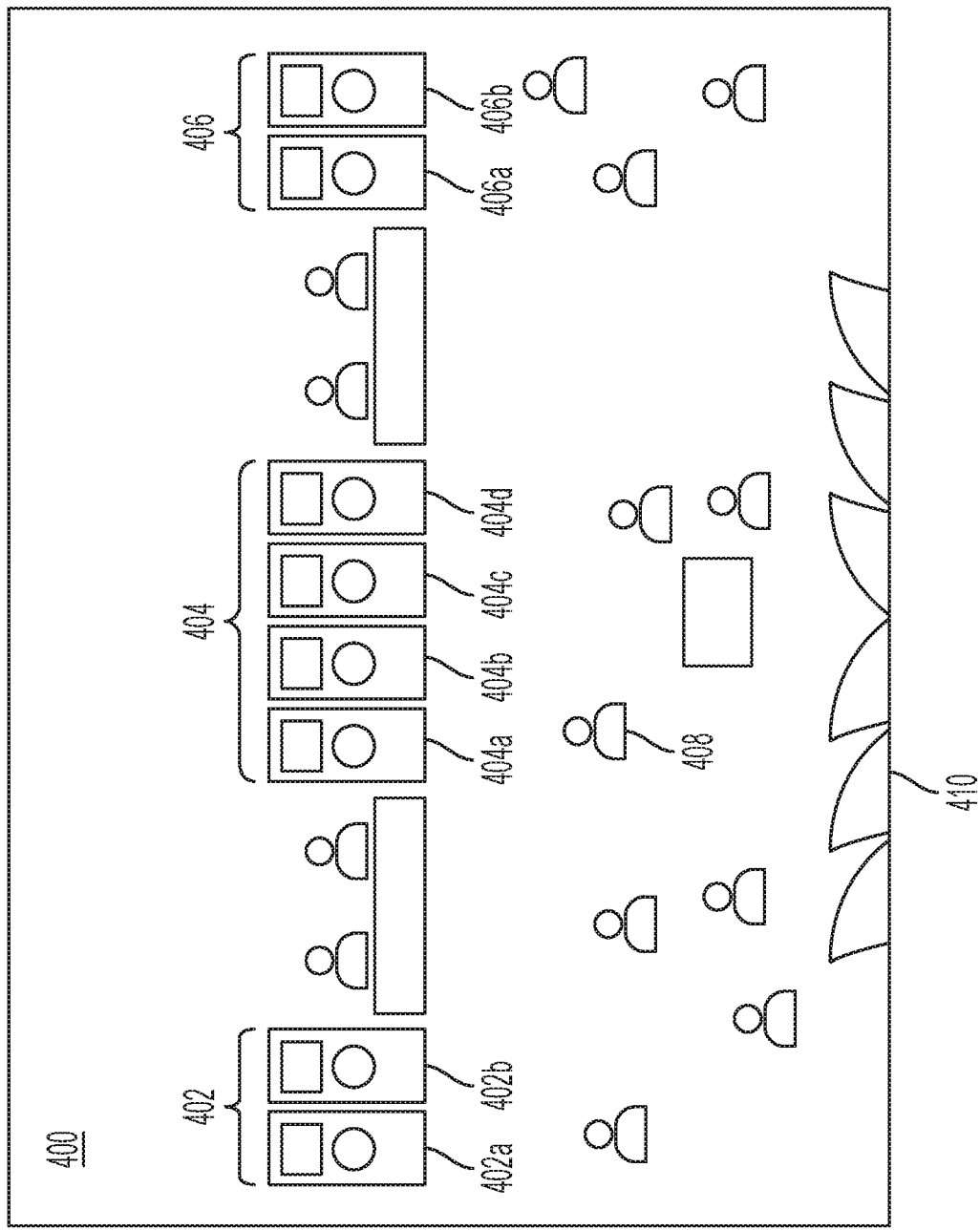
FIG. 4 illustrates an exemplary outlet with a plurality of beverage dispensers located therein according to various embodiments of the disclosure.

FIG. 4 illustrates an exemplary outlet 400 with a plurality of beverage dispensers located therein according to various embodiments of the disclosure. As shown, the outlet 400 includes a first bank 402 of beverage dispensers, a second bank 404 of beverage dispenser, and a third bank 406 of beverage dispensers. Each of the banks 402, 404, 406 of beverage dispensers includes one or more beverage dispensers. For example, bank 402 includes a beverage dispenser 402a and a beverage dispenser 402b. Likewise, the second bank 404 includes a beverage dispenser 404a, a beverage dispenser 404b, a beverage dispenser 404c, and a beverage dispenser 404d. Also, the third bank 406 includes a beverage dispenser 406a and a beverage dispenser 406b.

A consumer 408 may be one of many customers that enters the outlet 400 through an entrance 412. Upon entering the outlet 400 or coming within a predetermined distance of the outlet 400, a mobile device 122 carried by the consumer 408 may be determined to be within the first range of one or more beverage dispensers within the outlet 400. For example, upon entering the outlet 400, a profile associated with the consumer 408 may be pre-loaded on to all of the beverage dispensers in the outlet 400 and maintained on each in a respective database of regional profiles. Alternatively, upon coming within the first range of one of the banks 402, 404, 406, the profile associated with the consumer 408 may be pre-loaded on all of the beverage dispensers within the respective bank. For example, upon coming within the first range of the bank 404 of beverage dispensers, the profile associated with the consumer 408 is pre-loaded on all of the beverage dispensers within the bank 404 (e.g., dispensers 402a-402d). As a further example, upon entering a geofence location around or within a predetermined distance of the outlet 400, the mobile device 122 may determined to be within the first range of one or more beverage dispensers within the outlet 400.

Figure 5:
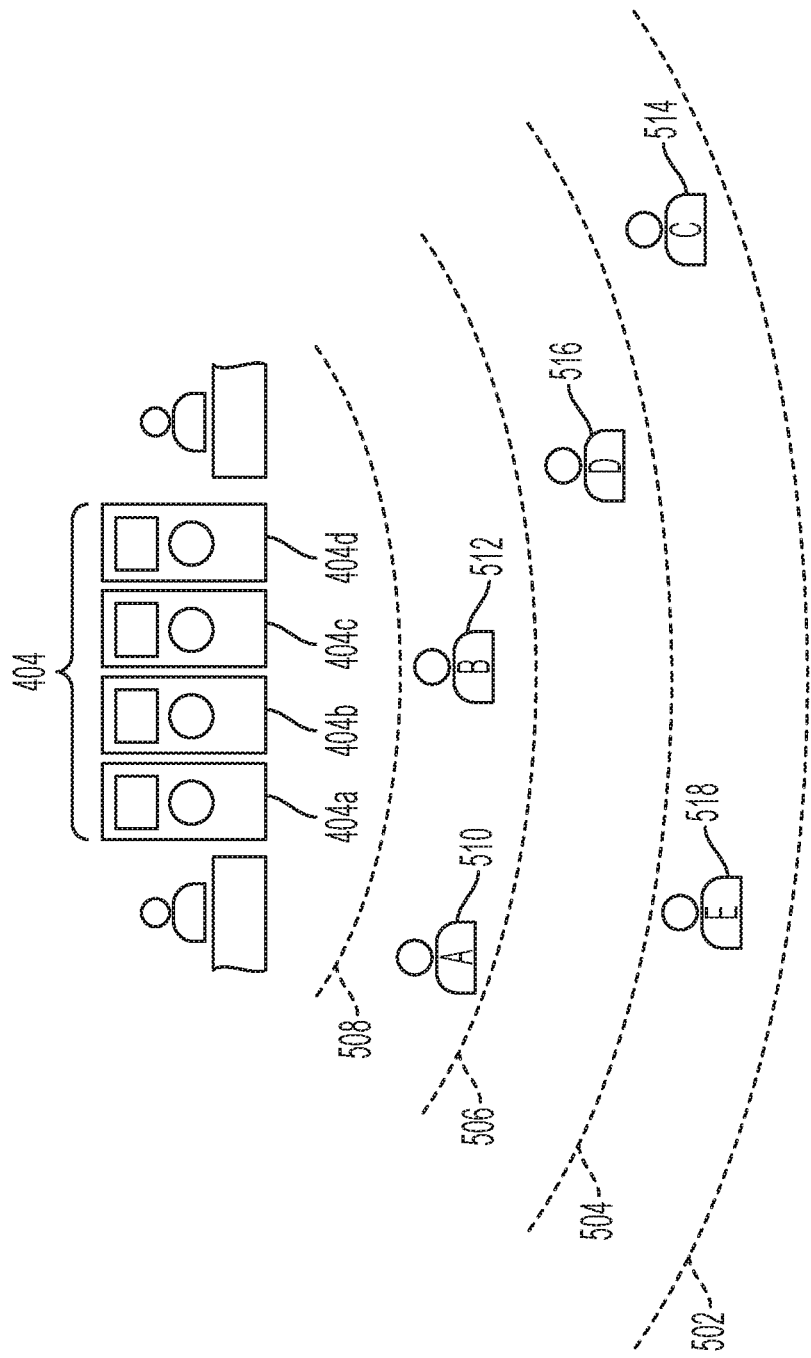
FIG. 5 illustrates a plurality of consumers at different ranges from a bank of beverage dispensers according to various embodiments of the disclosure.

FIG. 5 illustrates a plurality of consumers at different ranges from the second bank 404 of beverage dispensers 404a-404d according to various embodiments of the disclosure. As shown, consumers may be located at different ranges from the second bank 404 of beverage dispensers, including a first range 502, a second range 504, a third range 506, and a fourth range 508. The first range 502 may be located farthest away from the second bank 404 and the fourth range 508 may be located closest to the second bank 404. A first consumer 510 (consumer A) and a second consumer 512 (consumer B) may be located between the third range 506 and the fourth range 508. A fourth consumer 516 (consumer D) may be located between the second range 504 and the third range 506. A third consumer 514 (consumer C) and a fifth consumer 518 (consumer E) may be located between the first range 502 and the second range 504.

While a plurality of different ranges are shown, in some implementations only one or two ranges may be used. For example, in some implementations only the fourth range 508 or only the first range 502 and the fourth range 508 may be used. Other combinations of the shown ranges are contemplated by this disclosure. In some implementations, any one or more of the first, second, or third range 502, 504, 506 may be used as the first range to the beverage dispenser 102 described above and/or any one or more of the third or fourth range 506, 508 may be used as the second range to the beverage dispenser 102 described above.

While shown for simplicity as distinct ranges from the second bank 404, each dispenser within the second bank 404 may have one or more wireless communication devices that establish distinct communication ranges for the respective dispenser. For example, the beverage dispenser 404a may have a wireless communication device that has a corresponding range within the fourth range 508 that encompasses the adjacent beverage dispenser 404b, but does not encompass the remaining beverage dispensers 404c, 404d in the second bank 404. Likewise, the beverage dispenser 404b may have a wireless communication device that has a corresponding range within the fourth range 508 that encompasses the adjacent beverage dispensers 404a, 404c, but does not encompass the remaining beverage dispenser 404d, and so on.

As the consumers move through the outlet, they may pass through one or more of the ranges 502-508. For example, the first consumer 510 may move to address the beverage dispenser 404a and the second consumer 512 may move to address the beverage dispenser 404c. At the same time, the third, fourth, and fifth consumers 514, 516, 518 may move to other parts of the outlet 400 and not address any of the beverage dispensers in the second bank 404.

Figure 6:
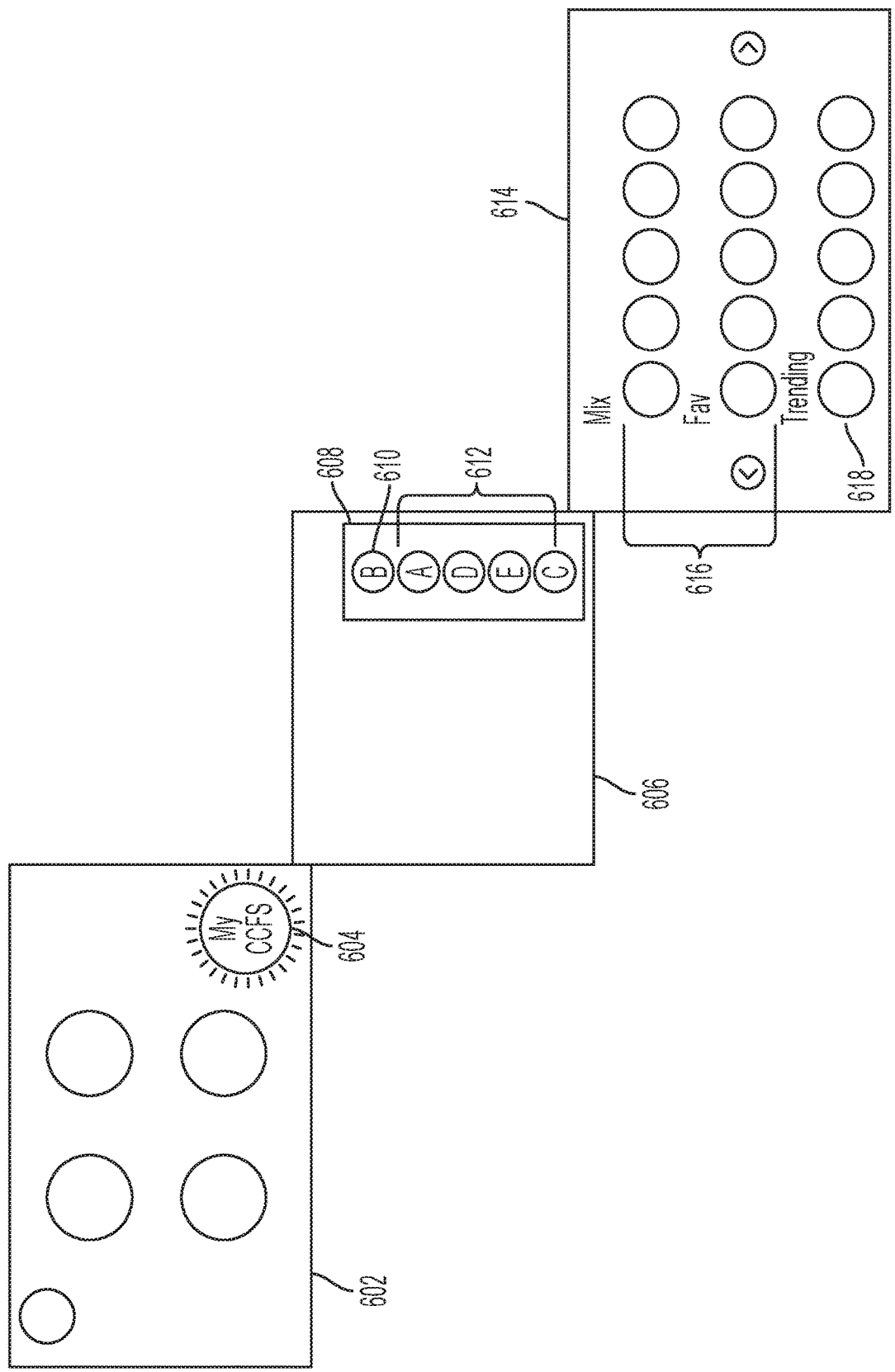
FIG. 6 illustrates exemplary graphical user interface screens on a beverage dispenser for navigating to a pre-loaded consumer profile according to various embodiments of the disclosure.

FIG. 6 illustrates exemplary graphical user interface screens on the beverage dispenser 102 for navigating to a pre-loaded consumer profile according to various embodiments of the disclosure. Following the example in FIG. 5 above, the graphical user interface screens shown in FIG. 6 may be displayed on the user interface 104 of the beverage dispenser 404c upon the second consumer 512 addressing the beverage dispenser 404c.

As shown, a main screen 602 may present a graphical user interface with a plurality of buttons for making a beverage selection. For example, one or more of the buttons on the main screen 602 are for navigating to sub-screens with different categories of beverages, such as described in commonly owned U.S. patent application Ser. No. 14/485,826, entitled "Product Categorization User Interface for a Dispensing Device," which is herein incorporated by reference in its entirety. The main screen 602 also includes a profile button 604 ("My CCFS") for selecting from among one or more pre-loaded consumer profiles, such as consumer profiles loaded on the beverage dispenser 404c as described above.

Upon selection of the profile button 604, a profile selection screen 606 is displayed on the user interface 104. The profile selection screen 606 includes a profile selection menu 608 that includes selectable profile buttons for one or more pre-loaded consumer profiles. In some implementations, the profile selection menu 608 may be displayed on the main screen 602 upon selection of the profile button 604. In some implementations, the profile selection menu 608 includes the profiles in the profile queue on the beverage dispenser 404c. In some implementations, the profile selection menu 608 includes a predetermined number of profiles from an arrangement of profiles (e.g., arranged by closest distance, strongest signal strength, most recently received profiles, etc.) in the database of regional profiles.

In the example shown in FIG. 6, the profile selection menu 608 includes an ordered list of the five closest mobile devices 122 to the beverage dispenser 404c. Each of the profiles is identified by a profile ID, such as a name, screen name, social media picture, avatar, alphanumeric identifier, other such text or graphics recognizable by a consumer to be associated with their corresponding profile. In the example shown in FIG. 6, the profile ID follows the consumer identifiers in the example shown in FIG. 5. As the second consumer 512 (consumer B) is addressing the beverage dispenser 404c, the profile ID 610 (B) is listed at the top of the profile selection menu 608.

The remaining profiles 612 in the profile selection menu 608 are listed in order of distance from the beverage dispenser 404c and include profile identifiers for the first consumer 510 (A), fourth consumer 516 (D), fifth consumer 518 (E), and third consumer 514 (C), respectively. In some implementations, one or more of the remaining profiles 612 may be grayed out to prevent selection or otherwise not shown in the profile selection menu 608. For example, the profiles D, E, and C may be grayed out to prevent selection or not shown in the profile selection menu 608 due to the consumers 516, 518, 514 not coming within the second range of a wireless communication device (e.g., within the third or fourth range 506, 508) of the beverage dispenser 404c.

Upon the second consumer 512 selecting a profile from the profile selection menu 608, a profile screen 614 is displayed on the user interface 104 of the beverage dispenser 404c. For example, the profile screen 614 may be displayed upon the second consumer 512 selecting the profile ID 610 (B) corresponding to their consumer profile that was pre-loaded onto the beverage dispenser 404c. The profile screen 614 includes one or more previously selected beverages 616, such as one or more mixes and/or one or more favorite beverages stored in the consumer profile associated with the selected profile ID. The profile screen 614 may additionally include one or more recommended beverages 618, such as beverages that are trending in the outlet 400 or other recommended beverages. Other beverage selection options may be displayed on the profile screen 614. Upon selection of a beverage from the profile screen 614, the beverage dispenser 404c is configured to dispense the selected beverage from the nozzle 106 upon selection of a pour mechanism (e.g., a pour button or lever on the dispenser or a virtual pour button on the user interface 104).

Following the examples above with the first consumer 510 moving to address the beverage dispenser 404a, a profile selection menu 608 displayed on a user interface 104 of the beverage dispenser 404a may likewise include an ordered list of the five closest mobile devices 122 to the beverage dispenser 404a. As such, the profile selection menu 608 displayed on the user interface 104 of the beverage dispenser 404a may have the profile ID A shown at the top of the list with profile ID B below. While a consumer's profile may be listed first in the profile selection menu 608, it is possible for them to select another consumer's profile (e.g., the first consumer 510 may opt to select the profile ID B).

By providing the profile selection menu 608 with a list of pre-loaded profiles as described above, a consumer does not need to actively engage with their mobile device 122 to perform a personalized interaction with the beverage dispenser 102 and access pre-selected beverage(s) from their profile. Accordingly, consumers may spend less time addressing a beverage dispenser to decide on which beverage to select.

Figure 7:
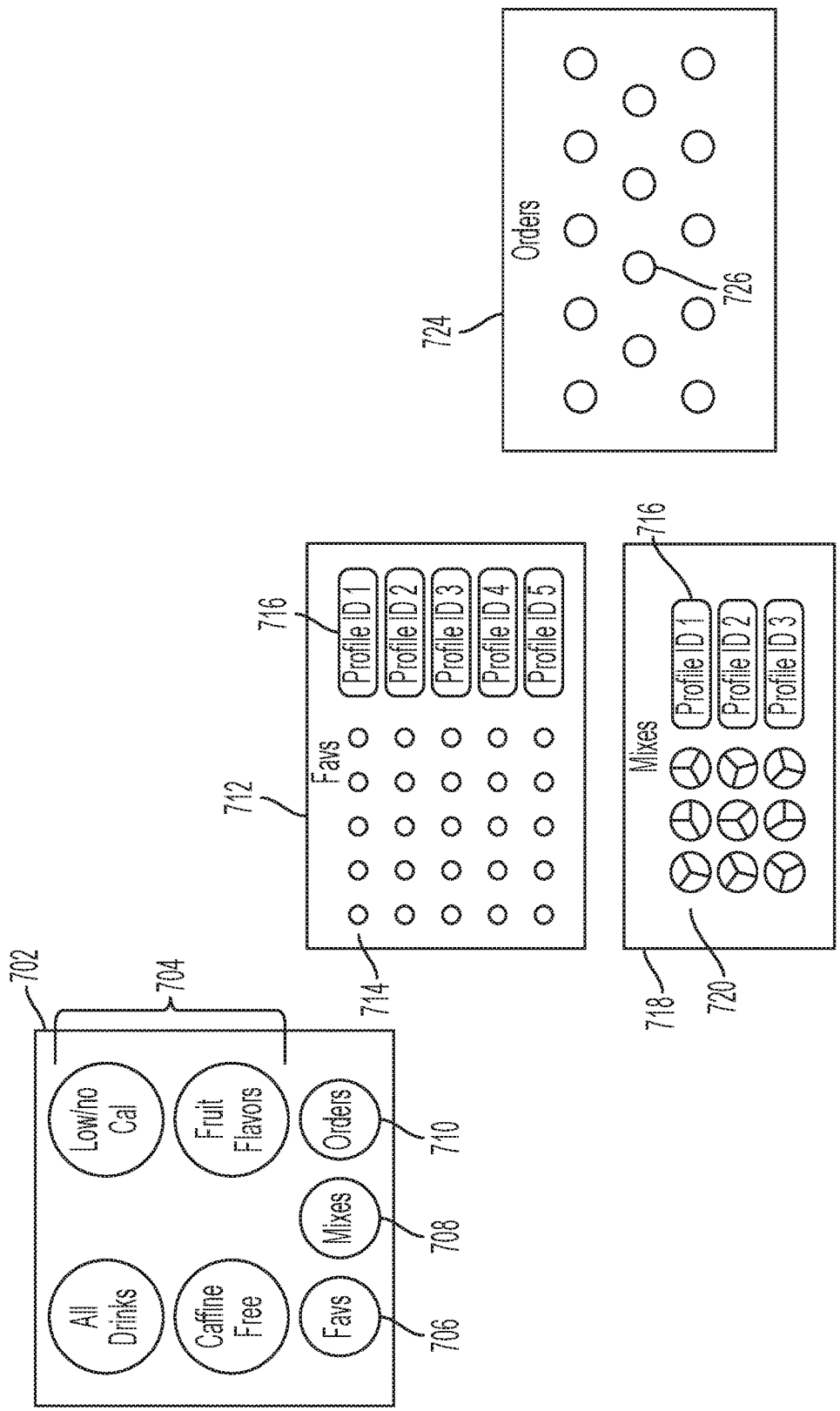
FIG. 7 illustrates exemplary graphical user interface screens on a beverage dispenser for navigating to previously selected beverages associated with a plurality of pre-loaded consumer profiles according to various embodiments of the disclosure.

FIG. 7 illustrates exemplary graphical user interface screens on a beverage dispenser for navigating to previously selected beverages associated with a plurality of pre-loaded consumer profiles according to various embodiments of the disclosure. Following the example in FIG. 5 above, the graphical user interface screens shown in FIG. 7 may be displayed on the user interface 104 of the beverage dispenser 404c upon the second consumer 512 addressing the beverage dispenser 404c.

As shown, a main screen 702 may present a graphical user interface with a plurality of buttons for making a beverage selection. For example, one or more of the buttons 704 on the main screen 702 are for navigating to sub-screens with different categories of beverages, such as described in U.S. patent application Ser. No. 14/485,826, entitled "Product Categorization User Interface for a Dispensing Device," noted above. The main screen 702 also includes one or more buttons of categories of pre-selected beverages maintained in user profiles. For example, the main screen 702 may include a selectable favorite beverages icon 706, a selectable mixes icon 708, and a selectable orders icon 710.

Upon selection of the favorite beverage icon 706, a favorites screen 712 may be displayed on the user interface 104. The favorites screen 712 lists the top five favorite beverages from each of a plurality of profiles, for example from each of the profiles in the profile queue or a predetermined number of profiles from an arrangement of profiles in the database of regional profiles. Other numbers of favorite beverages from each profile may be shown in various implementations. For example, the favorites screen 712 lists five favorite beverages 714 associated with a first profile identifier 716 ("Profile ID 1"). Following the examples above, the first profile 716 may be associated with the second consumer 512. Similarly, each of the lists of favorite beverages may be associated with a profile identifier. As discussed above, the profile identifiers may be a name, screen name, social media picture, avatar, alphanumeric identifier, other such text or graphics recognizable by a consumer to be associated with their corresponding profile. In some implementations, the profile identifiers may not be shown on the favorites screen 712.

Upon selection of the mixes icon 708, a mixes screen 718 may be displayed on the user interface 104. The mixes screen 718 lists the top three mixes from each of a plurality of profiles, for example from each of the profiles in the profile queue or a predetermined number of profiles from an arrangement of profiles in the database of regional profiles. Other numbers of mixes from each profile may be shown in various implementations. For example, the mixes screen 718 lists three beverage mixes 720 associated with a first profile identifier 716 ("Profile ID 1"). Following the examples above, the first profile 716 may be associated with the second consumer 512. Similarly, each of the lists of beverage mixes may be associated with a profile identifier. As discussed above, the profile identifiers may be a name, screen name, social media picture, avatar, alphanumeric identifier, other such text or graphics recognizable by a consumer to be associated with their corresponding profile. In some implementations, the profile identifiers may not be shown on the mixes screen 718.

By showing the favorite beverages or beverage mixes from the profile of the second consumer 512 in addition to the favorite beverages or beverage mixes from other profiles, the second consumer 512 may be provided with a diverse set of popular beverages or beverage mixes. For example, the favorites screen 712 may facilitate the second consumer 512 to quickly select one of their pre-selected favorite beverages or select from pre-selected favorite beverages in other consumer's profiles. Likewise, the mixes screen 718 may facilitate the second consumer 512 to quickly select one of their pre-selected beverage mixes or select from pre-selected beverage mixes in other consumer's profiles. While shown with the pre-selected favorite beverages associated with a given profile on each row of the favorites screen 712, the favorite beverages of a given profile may be arranged in any suitable manner, such as in columns. Similarly, the beverage mixes in the mixes screen 718 may be arranged in columns or any other suitable manner.

Upon selection of the orders icon 710, an orders screen 724 may be displayed on the user interface 104. The orders screen 725 lists pre-selected beverage orders. For example, the beverage selections in the orders screen 725 may be received from the POS device 124 as described above or from order selections associated with a predetermined number of profiles, as described in more detail below with reference to FIG. 9. For example, the order selections may be from each of the profiles in the profile queue or a predetermined number of profiles from an arrangement of profiles in the database of regional profiles. For example, the orders screen 724 may include a pre-selected beverage order 726 from the profile associated with the second consumer 512. As shown in FIG. 7, profile identifiers are not shown with each of the beverage orders. In some implementations, a profile identifier may be shown in association with beverage orders received from profiles.

Figure 8:
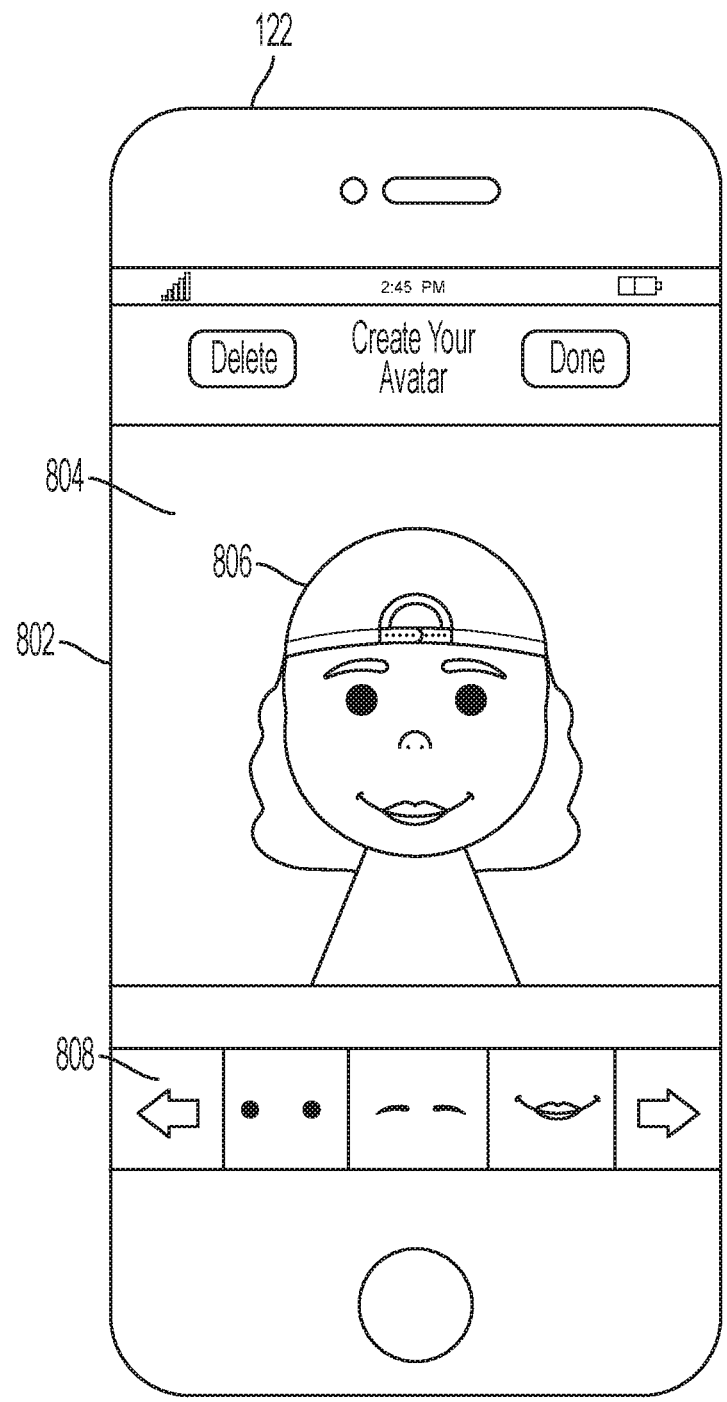
FIG. 8 illustrates an exemplary graphical user interface screen on a mobile device for designing an avatar for associating with a consumer profile according to various embodiments of the disclosure.

FIG. 8 illustrates an exemplary graphical user interface screen on a mobile device 122 for designing an avatar for associating with a consumer profile according to various embodiments of the disclosure. As discussed above, the avatar, once created and stored in a consumer's profile, may be used as the profile identifier on the user interface 104 of the beverage dispenser 102. Accordingly, the consumer may be able to readily recognize their profile without revealing any of their personal information.

As shown, the mobile device 122 includes a user interface 802, such as a touchscreen display. An application 804 installed on the mobile device facilitates designing an avatar 806 for associating with a consumer profile. For example, the application 804 for designing the avatar 806 may be integrated with the application for maintaining the consumer profiles with pre-selected beverages. In some implementations, the application 804 for designing the avatar 806 may be a separate application that supplies the created avatar for inclusion as part of a consumer's profile. For example, the application 804 may be provided by a third-party avatar personalization organization that specializes in avatar personalization. As shown, one or more selections 808 are made available for customizing the avatar so that the avatar is readily recognizable by a consumer. Once created, the avatar may be displayed on the beverage dispenser with dynamic modifications, such as to the background on the screen, or clothing, or accessories can change according to the user's preferences in but not limited to weather, drink selection, time of day, social media etc. Other modifications or variations to the creation or display of the avatar are contemplated by this disclosure.

Figure 9:
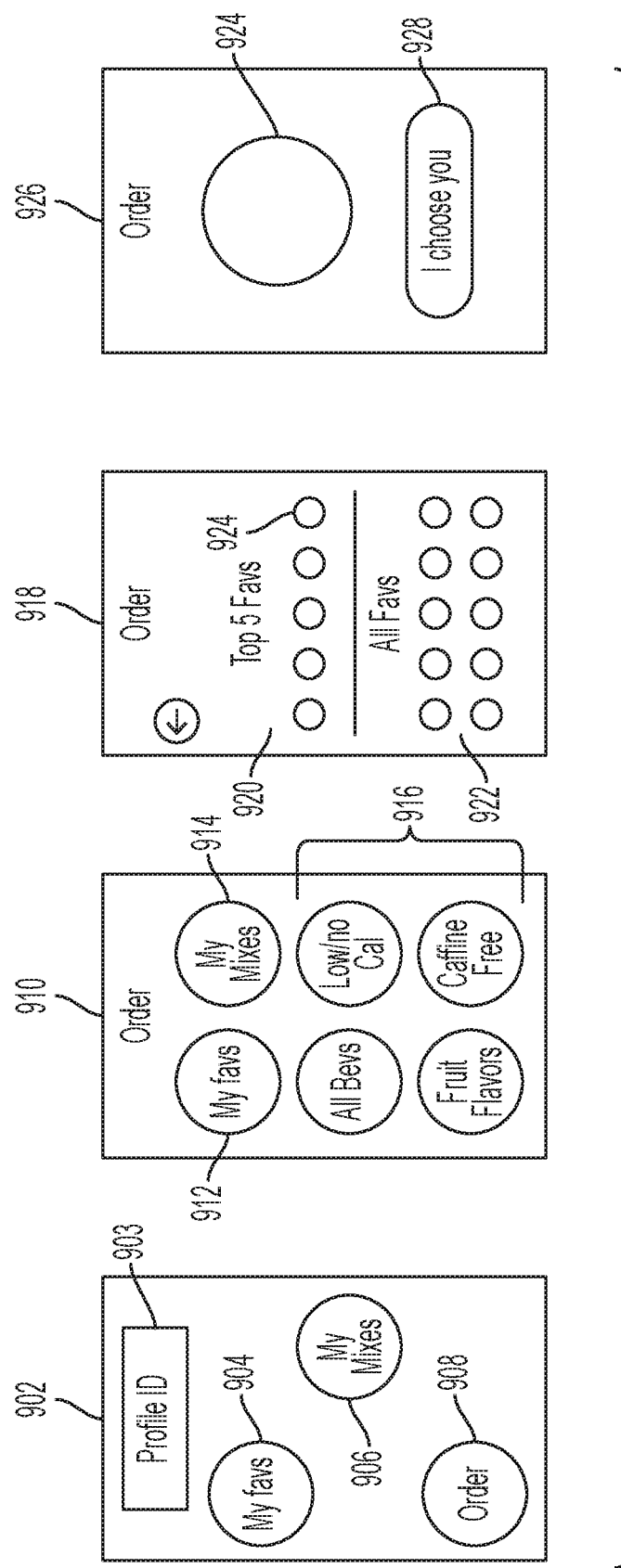
FIG. 9 illustrates exemplary graphical user interface screens on a mobile device for selecting and associating a beverage order with a consumer profile according to various embodiments of the disclosure.

FIG. 9 illustrates exemplary graphical user interface screens on the mobile device 122 for selecting and associating a beverage order with a consumer profile according to various embodiments of the disclosure. Each of the graphical user interface screens shown in FIG. 9 may be displayed via a user interface on the mobile device 122, such as on a touchscreen display. A profile mobile application on the mobile device 122 facilitates customizing a consumer's profile. A main screen 902 on the profile mobile application includes a profile ID 903, such as the avatar defined as described above with reference to FIG. 8. Upon selection of the profile ID 903, the application 804 may be launched for defining or modifying the avatar. When other profile IDs are used, such as other text, graphics, or pictures, the profile ID may be defined or updated upon selecting the profile ID 903. Likewise, a consumer may select a selectable favorites icon 904 or a selectable mixes icon 906 to define their favorite beverages or mixed beverages.

The main screen 902 additionally includes a selectable order icon 908. Upon selection of the order icon 908, an order screen 910 may be shown for pre-selecting a next beverage that the consumer wants to dispense. For example, the order screen 910 may be used by a consumer prior to entering an outlet or while in line at an outlet to select their desired beverage. Upon addressing a compatible beverage dispenser, their pre-selected beverage order may be displayed on the orders screen 724, for example.

From the order screen 910, a plurality of beverage selection options may be presented. For example, one or more of the buttons 916 on the order screen 910 may be for navigating to sub-screens with different categories of beverages. Additionally, a selectable favorites icon 912 and a selectable mixes icon 914 may be presented. Upon selection of either the favorites icon 912 or the mixes icon 914 facilitates the consumer for selecting one of their favorites or mixes defined in their profile for their next beverage order.

In the example shown in FIG. 9, upon selection of the favorites icon 912, the user interface of the mobile device 122 displays a favorites screen 918. The favorites screen 918 shows the favorite beverages that are associated with the consumer's profile. In the example shown in FIG. 9, the favorites screen 918 may show the consumer's top five favorites 920 in addition to the remainder of the consumer's favorites 922. In the example shown, the consumer selects a beverage icon 924 from one of the top five favorite beverages in the consumer's profile.

In response to selecting a beverage icon, an order verification screen 926 is displayed on the user interface of the mobile device 122. For example, the order verification screen 926 may display the selected beverage icon 924 and include a selectable verification icon 928 ("I choose you") to verify their selection of the selected beverage icon 924 for their next order. Other variations and modifications of the order selection screens shown in FIG. 9 are contemplated by this disclosure. For example, one or more of the screens or icons may be omitted and other options not shown may be included.

Described herein are example systems and methods for controlling selection of a beverage in a beverage dispensing system (such as a Coca-Cola® Freestyle®, traditional fountain dispenser, or traditional fountain dispenser with micro-ingredients). For example, a beverage dispensing system (which may include one or more macro-ingredients and one or more micro-ingredients) combines macro-ingredients (such as sweeteners, water, or carbonated water) and micro-ingredients (such as high intensity sweeteners, flavorings, food acids, or additives) to create a finished beverage. Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

Figure 10:
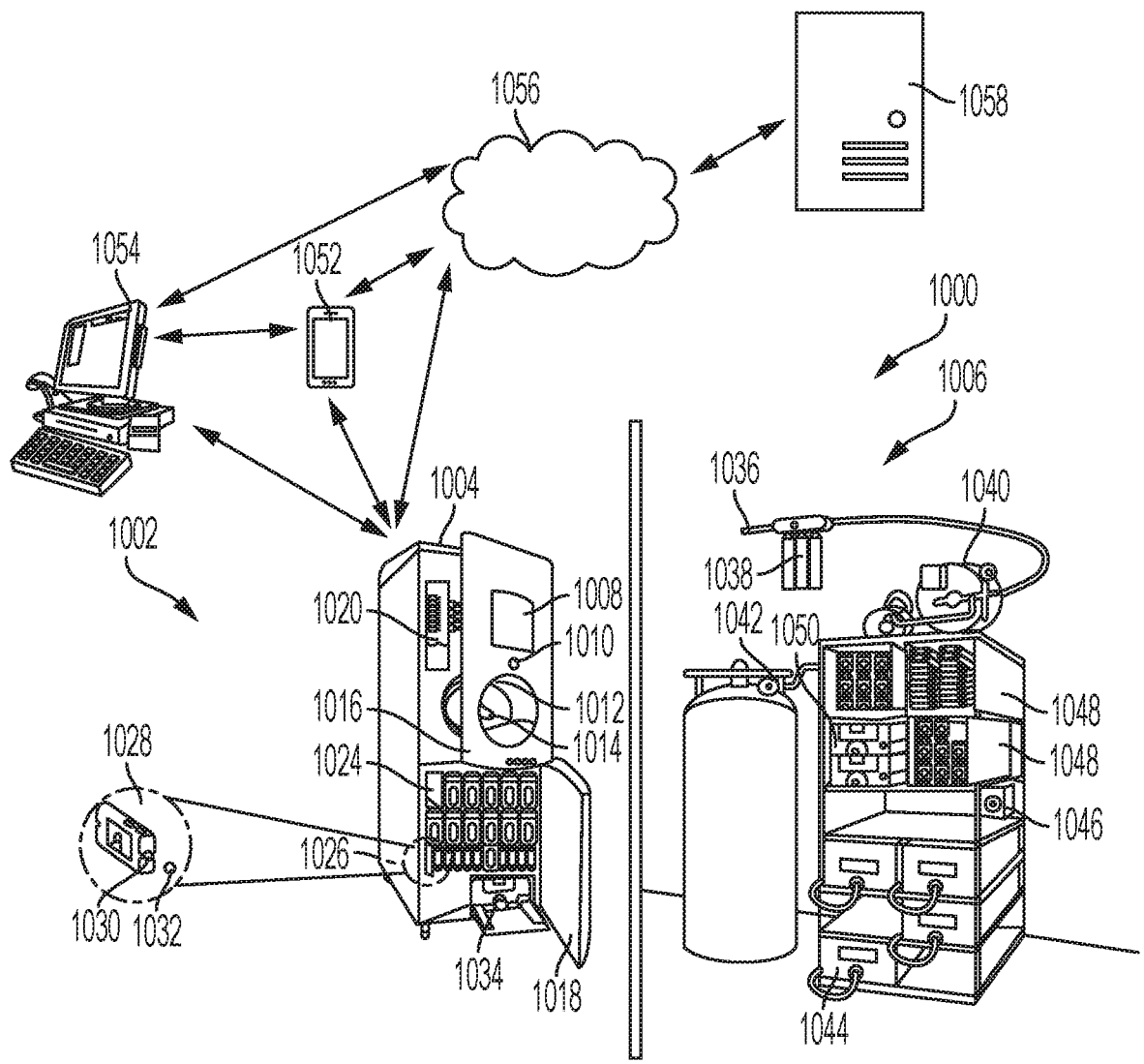
FIG. 10 illustrates an exemplary beverage dispenser system suitable for implementing the several embodiments of the disclosure.

FIG. 10 illustrates an exemplary beverage dispenser system 1000 suitable for implementing the several embodiments of the disclosure. As shown, the beverage dispenser system 1000 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 1000 includes a front room system 1002 with a beverage dispenser 1004 and a back room system 1006. The beverage dispenser 1004 includes a user interface 1008, such as a touchscreen display, to facilitate selection of the beverage to be dispensed. The user interface 1008 may employ various screens to facilitate user interactions on the beverage dispenser 1004 and/or receive a user profile through interaction with a user's mobile device 1052, such as described in commonly owned U.S. patent application Ser. No. 14/485,826, entitled "Product Categorization User Interface for a Dispensing Device," which is herein incorporated by reference in its entirety.

Upon receiving a beverage selection via the user interface 1008, a pour button 1010 may be activated to dispense the selected beverage from the beverage dispenser 1004 via a nozzle 1014. For example, the pour button 1010 may be an electromechanical button, capacitive touch button, or other button selectable by a user to activate the beverage dispenser 1004 to dispense a beverage. While shown as a button, the pour button 1010 may alternatively be implemented as a lever or other mechanism for activating the beverage dispenser 1004 to dispense a beverage. As shown in FIG. 10, the pour button 1010 is separate from the user interface 1008. In some implementations, the pour button 1010 may be implemented as a selectable icon in the user interface 1008.

In some implementations, the beverage dispenser may also include an ice lever 1014. Upon being activated, the ice lever 1014 may cause the beverage dispenser 1004 to dispense ice through an ice chute (not shown). For beverage dispensers that do not have an ice bin, such as counter-electric or remote recirculation beverage dispensers, the ice lever 1014 may be omitted.

The beverage dispenser 1004 may be secured via a primary door 1016 and an ingredient door 1018. The primary door 1016 and the ingredient door 1018 may be secured via one or more locks. In some implementations, the locks are a lock and key. In some implementations, the lock on the ingredient door 1018 may be opened via an RFID reader (not shown) reading an authorize ingredient package 1028. The primary door 1016 may secure electronic components of the beverage dispenser 1004 including one or more controllers 1020. The ingredient door 1018 may secure an ingredient compartment that houses an ingredient matrix 1024.

The ingredient matrix 1024 includes a plurality of slots 1026 for receiving ingredient packages 1028. In various implementations, the ingredient packages 1028 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 10, there are three drawers of ingredients in the ingredient matrix 1024. One or more of the drawers may slide back and forth along a rail so as to periodically agitate the ingredients housed on the drawer. Other configurations of the ingredient matrix 1024 are possible, such as via one or more static and/or agitated ingredient towers.

Each ingredient package 1028 may comprise an RFID tag, a fitment 1030, and a fitment seal 1032. The fitment seal 1032 may be removed prior to installation into the beverage dispenser 1004. Upon installation, the fitment 1030 may engage with and provide a fluidic communication between a probe (not shown) in the slot 1026 and the ingredients contained in the ingredient package 1028. The ingredient matrix 1024 may also contain one or more large volume micro-ingredient packages 1034, such as for one or more micro-ingredient sweetener sources.

The beverage dispenser 1004 may also include a carbonator (not shown) for receiving water and carbon dioxide to produce carbonated water. The beverage dispenser 1004 may also include one or more heat exchangers (not shown), such as a cold plate, for cooling one or more of the beverage ingredients contained in or received by the beverage dispenser 1004. In some implementations, one or more of the micro-ingredients dispensed via the nozzle 1012 are not cooled via the heat exchanger or are otherwise maintained at an ambient temperature. Macro-ingredients dispensed via the nozzle 1012 are typically cooled via the heat exchanger prior to being dispensed.

The back room system 1006 is typically located in a back room remote from the front room system 1002, such as a storage area in a merchant location. The back room system 1006 includes a water source 1036 such as a municipal water supply that provides a pressurized source of plain water. The water received via the water source 1036 may be filtered or otherwise treated by a water treatment system 1038. The treated water may optionally be pressurized to a desired pressure with a water booster 1040 and supplied to the beverage dispenser. A carbon dioxide source 1042 may supply carbon dioxide to the beverage dispenser 1004.

One or more macro-ingredient sources 1044 may be located in the back room. The macro-ingredient from each macro-ingredient source 1044 may be supplied to the beverage dispenser 1004 via a pump 1046. The pump 1046 may be a controlled gear pump, diaphragm pump, BIB pump, or any other suitable pump for supplying macro-ingredients to the beverage dispenser 1004. The back room system 1006 may also include a rack with one or more storage locations 1048 for spare micro-ingredients and one or more storage locations 1050 for spare macro-ingredients.

The beverage dispenser 1004 may include one or more network interfaces for communicating directly with devices in the front room or the back room, communicating with devices in the front room or the back room in a local area network (LAN), or communicating with devices remote from a location with the beverage dispenser system 1000 via a wide area network (WAN) connection. For example, the beverage dispenser 1004 may include networking devices such as a near field communication (NFC) module, a BLUETOOTH module, a WiFi module, a cellular modem, an Ethernet module, and the like. The beverage dispenser 1004 may communicate via a direct communication or via a LAN with a user's mobile device 1052 or a point-of-sale (POS) device 1054 to receive a beverage selection or user profile of a user for configuring the beverage dispenser 1004 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 1004 may also communicate via a WAN 1056 for communicating with one or more remote servers 1058 to receive software updates, content updates, user profiles, or beverage selections made via the remote server 1058.

FIGS. 11-13 illustrate exemplary fluidic circuits 1100-1300 with pumping or metering devices from ingredient sources 1102, 1202, 1302 to the nozzle 1012 of the beverage dispenser 1004. The beverage dispenser 1004 may include none, one, or a plurality of the fluidic circuits shown in FIGS. 11-13. For each ingredient source, the beverage dispenser 1004 may include one of the fluidic circuits shown in FIGS. 11-13.

FIG. 11 illustrates an exemplary fluidic circuit 1100 with a positive displacement pump 1110 suitable for implementing the several embodiments of the disclosure. The fluidic circuit 1100 provides a fluid path from the ingredient source 1102 to the nozzle 1012. The ingredient source 1102 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The positive displacement pump 1110 may meter a predetermined volume or flow rate of ingredient from the ingredient source 1102 to the nozzle 1012. The positive displacement pump 1110 may be a piston pump, controlled gear pump, peristaltic pump, nutating pump, diaphragm pump, or other such positive displacement pump for metering a fixed volume of flow rate of a fluid with each cycle of the pump.

The fluidic circuit 1100 may optionally include a sold-out sensor 1104 for detecting when the ingredient source 1102 is empty. When the ingredient source 1102 is remotely located from the beverage dispenser 1004, the fluidic circuit 1100 may also optionally include an auxiliary pump 1106 for providing a pressurized supply of the beverage ingredient to the beverage dispenser 1004. Within or immediately adjacent to the beverage dispenser 1004, the fluidic circuit 1100 may include a pressure regulator 1108 such that the inlet of the positive displacement pump 1110 receives a lower or zero pressure supply of beverage ingredient. The fluidic circuit 1100 may also optionally include a shut-off valve 1112 that is configured to remain closed when an ingredient is not being dispensed so as to prevent beverage ingredient from dripping from the nozzle 1012.

FIG. 12 illustrates an exemplary fluidic circuit 1200 with a static mechanical flow control 1208 suitable for implementing the several embodiments of the disclosure. The static mechanical flow control 1208 receives a pressurized beverage ingredient from an ingredient source 1202 and provides a fixed flow rate of the beverage ingredient to the nozzle 1012. The static mechanical flow control 1208 may be calibrated with a set screw for configuring the flow rate of the static mechanical flow control 1208. A shut-off valve 1210 downstream of the static mechanical flow control 1208 may be actuated to open and close in order to dispense or prevent dispensing the beverage ingredient from the nozzle 1012.

The ingredient source 1202 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The ingredient source 1202 may also be the municipal water supply 1036 or other pressurized ingredient source. When the ingredient source 1202 is not pressurized, the fluidic circuit 1200 may include a pump 1206 for pressurizing the beverage ingredient from the ingredient source 1202. The pump 1206 may be any pump suitable for pressurizing the beverage ingredient from the ingredient source 1202, such as a BIB pump, $CO_2$ driven pump, controlled gear pump, or positive displacement pump. The fluidic circuit 1200 may also optionally include a sold-out sensor 1204 for detecting when the ingredient source 1202 is empty.

FIG. 13 illustrates an exemplary fluidic circuit 1300 with a dynamic mechanical flow control 1308, a flow meter 1310, and a shut-off valve 1312 suitable for implementing the several embodiments of the disclosure. The dynamic mechanical flow control 1308 receives a pressurized beverage ingredient from an ingredient source 1302 and provides an adjustable flow rate of the beverage ingredient to the nozzle 1012. The dynamic mechanical flow control 1308 may include a variable sized orifice that adjusts to dynamically change the flow rate of the beverage ingredient supplied to the nozzle 1012 based on control signals provided by the one or more controllers 1020. A flow meter 1310 downstream of the dynamic mechanical flow control 1308 measures a flow rate of the beverage ingredient being supplied by the dynamic mechanical flow control 1308 and provides a feedback loop to the dynamic mechanical flow control 1308 for controlling the variable sized orifice. A shut-off valve 1312 downstream of the dynamic mechanical flow control 1308 may be actuated to open and close in order to dispense or prevent dispensing the beverage ingredient from the nozzle 1012.

The ingredient source 1302 may be a micro-ingredient source or a macro-ingredient source housed in the ingredient matrix 1024 of the beverage dispenser 1004, remote from the beverage dispenser 1004 in the front room (e.g., adjacent to the beverage dispenser 1004 or under a counter on which the beverage dispenser 1004 is located), or located in the back room. The ingredient source 1302 may also be the municipal water supply 1036 or other pressurized ingredient source. When the ingredient source 1302 is not pressurized, the fluidic circuit 1300 may include a pump 1306 for pressurizing the beverage ingredient from the ingredient source 1302. The pump 1306 may be any pump suitable for pressurizing the beverage ingredient from the ingredient source 1302, such as a BIB pump, $CO_2$ driven pump, controlled gear pump, or positive displacement pump. The fluidic circuit 1300 may also optionally include a sold-out sensor 1304 for detecting when the ingredient source 1302 is empty.

While the components of the fluidic circuits 1100-1300 are shown in a particular order in FIGS. 11-13, any order of the components described above may be used. For example, the shut-off valve 1312 may be upstream of the flow meter 1310. Other variations are readily recognizable by those of ordinary skill in the art. Additionally, one or more heat exchangers (not shown) may be used at any location in the fluidic circuits of FIGS. 11-13. The heat exchanger may include an ice bin, water bath, cold plate, or remote recirculation system.

Figure 14:
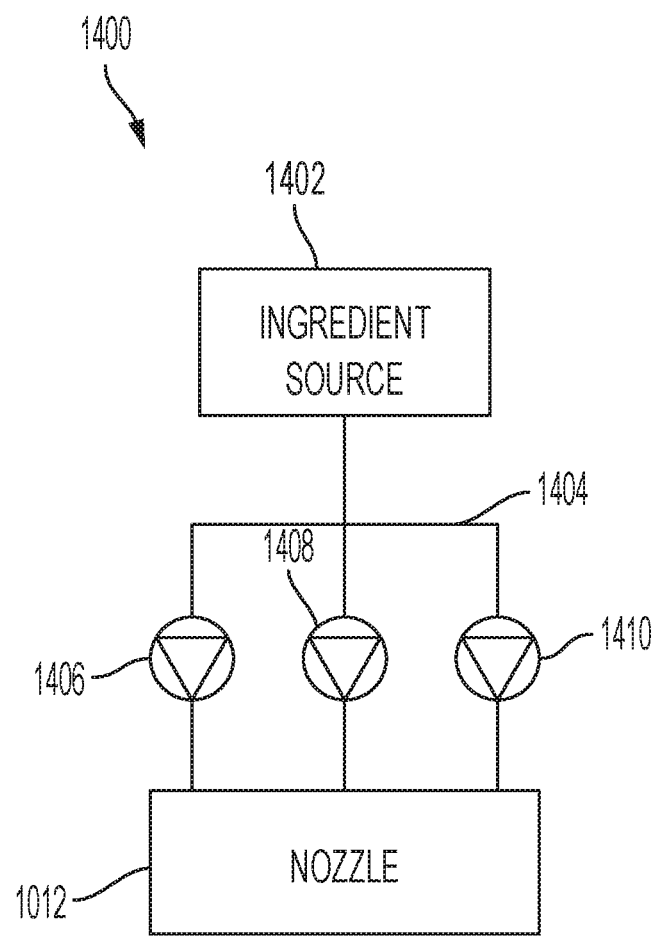
FIG. 14 illustrates an exemplary fluidic circuit with a plurality of independently controlled paths from a single ingredient source suitable for implementing the several embodiments of the disclosure.

FIG. 14 illustrates an exemplary fluidic circuit 1400 with a plurality of independently controlled paths from a single ingredient source 1402 to the nozzle 1012 suitable for implementing the several embodiments of the disclosure.

The fluidic circuit 1400 includes a manifold 1404 for supplying beverage ingredient to each of the independently controlled paths. Each path includes a pumping or metering device 1406, 1408, 1410 for supplying beverage ingredient from the ingredient source 1402 to the nozzle 1012. The pumping or metering devices 1406, 1408, 1410 may be configured as any of the fluidic circuits 1100-1300 shown in FIGS. 1I-13. By having multiple independent paths from the ingredient source 1402 to the nozzle 1012, a larger range of flow rates are possible than using any one of the pumping or metering devices 1406, 1408, 1410. For example, for a first flow rate of beverage ingredient from the ingredient source, only one of the pumping or metering devices 1406, 1408, 1410 may be activated. For a second flow rate of the beverage ingredient from the ingredient source, a plurality of the pumping or metering devices 1406, 1408, 1410 may be activated.

Figure 15:
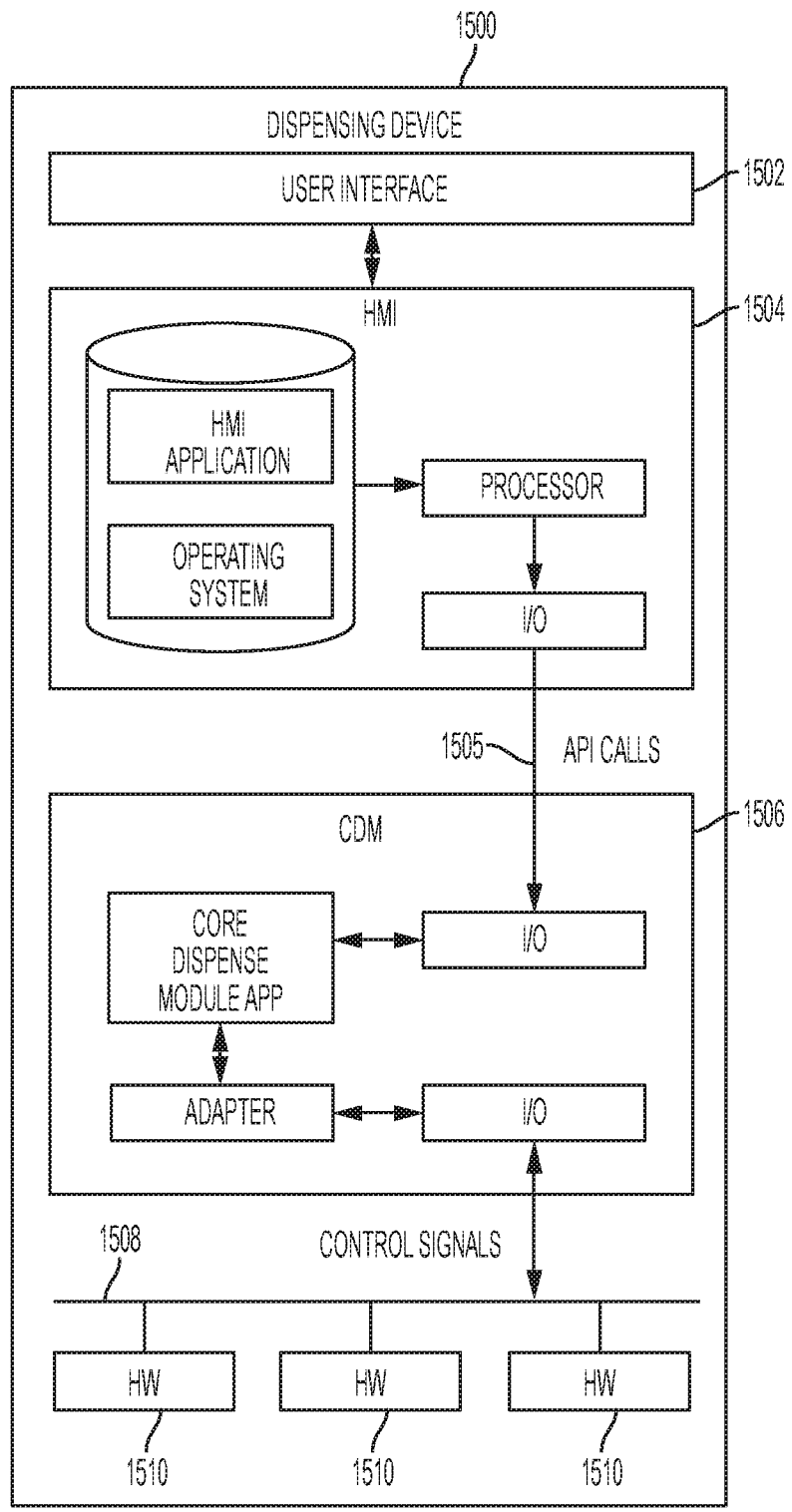
FIG. 15 illustrates an exemplary block diagram of a control architecture for a beverage dispenser suitable for implementing the several embodiments of the disclosure.

FIG. 15 illustrates an exemplary block diagram of a control architecture 1500 that may be used to control the beverage dispenser 1504 suitable for implementing the several embodiments of the disclosure. As shown in FIG. 15, control architecture 1500 may comprise a core dispense module (CDM) 1006, a human machine interface (HMI) module 1504, a user interface (UI) 1502, and a machine bus (MBUS) 1005. HMI 1504 may connect to or otherwise interface and communicate with at least one external device (e.g., mobile device 1052 or POS 1054) being external to beverage dispenser 1504. HMI 1504 may also control and update display screens on UI 1502. CDM 1506 may control flows from a plurality of pumps and/or valves 1510 in beverage dispenser 1504 according to a recipe to mix and dispense a product (e.g., a beverage) from beverage dispenser 1504.

Beverage ingredients (e.g., micro-ingredients, macro-ingredients, and/or diluents) may be combined to dispense various products that may include beverages or blended beverages (i.e., finished beverage products) from beverage dispenser 1504. However, beverage dispenser 1504 may also be configured to dispense beverage components individually.

An example of control architecture 1500 for beverage dispenser 1504 may be described in U.S. Ser. No. 61/987,020, entitled "Dispenser Control Architecture", filed on May 1, 2014, the entirety of which is hereby incorporated by reference. MBUS 1005 may facilitate communication between HMI 1504 and CDM 1506 via one or more API calls. HMI 1504, MBUS 1005, and CDM 1506 may collectively comprise common core components, implemented as hardware or as combination of hardware and software, which may be adapted to provide customized functionality in beverage dispenser 1504. Beverage dispenser 1504 may further include memory storage and a processor. Examples of UI 1502 may be described in U.S. Ser. No. 61/877,549, entitled "Product Categorization User Interface for a Dispensing Device", filed on Sep. 13, 2013, the entirety of which is hereby incorporated by reference.

UI 1502 may detect what area of a touch screen has been touched by a user (e.g., user 108). In response, UI 1502 may send HMI 1504 data regarding where the touch screen was touched. In response, HMI 1504 may interpret this received data to determine whether to have UI 1502 display a different UI screen or to issue a command to CDM 1506. For example, HMI 1504 may determine that the user touched a portion of the touch screen corresponding to a beverage brand. In response, HMI 1504 may issue a command to CDM 1506 to pour the corresponding beverage brand. In response to receiving the command to pour the corresponding beverage brand, the CDM 1506 in turn issues commands via one or more control buses 1508 to the pumping or metering devices 1510 for the beverage ingredients needed to dispense the beverage brand. Or HMI 1504 may determine that the user touched a portion of the touch screen corresponding to a request for another screen. In response, HMI 1504 may cause UI 1502 to display the requested screen.

In some embodiments, UI 1502 in beverage dispenser 1504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1502 may be addressed via a number of methods to select and dispense beverages. For example, a user may interact with UI 1502 via touch input to navigate one or more menus from which to select and dispense a beverage. As another example, a user may type in a code using an onscreen or physical keyboard (not shown) on beverage dispenser 1504 to navigate one or more menus from which to select and dispense a beverage. As a further example, a user may interact with the HMI 1504 via a user interface of an application on the mobile device 1052.

UI 1502, which may include a touch screen and a touch screen controller, may be configured to receive various commands from a user (i.e., consumer input) in the form of touch input, generate a graphics output and/or execute one or more operations with beverage dispenser 1504 (e.g., via HMI 1504 and/or CDM 1506), in response to receiving the aforementioned commands. A touch screen driver in HMI 1504 may be configured to receive the consumer or customer inputs and generate events (e.g., touch screen events) that may then be communicated through a controller to an operating system of HMI 1504.

Beverage dispenser 1504 may be in communication with one or more external device (e.g., mobile device 1052 or POS 1054). In some embodiments, the communication between beverage dispenser 1504 and the external device may be accomplished utilizing any number of communication techniques including, but not limited to, near-field wireless technology such as BLUETOOTH, Wi-Fi and other wireless or wireline communication standards or technologies, via a communication interface.

Figure 16:
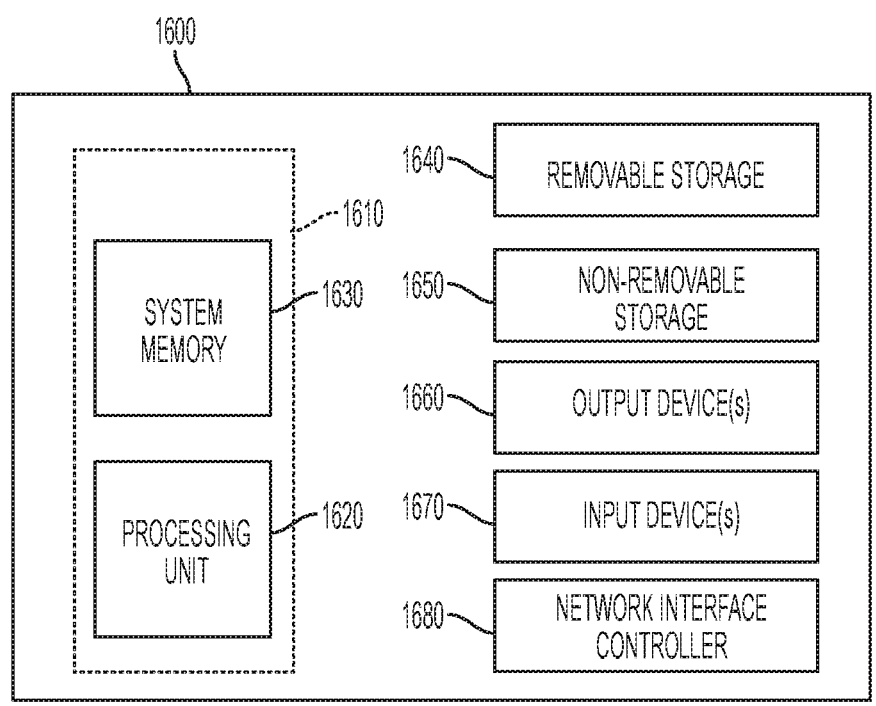
FIG. 16 illustrates an exemplary computer system suitable for implementing the several embodiments of the disclosure.

FIG. 16 illustrates an exemplary computer system 1600 suitable for implementing the several embodiments of the disclosure. For example, one or more components or controller components of the beverage dispenser 1504 may be implemented as the computer system 1600. In some implementations, one or both of the HMI 1504 and the CDM 1506 may be implemented as the computer system 1600.

It should be appreciated that the logical operations described herein with respect to the various figures may be implemented (1) as a sequence of computer implemented acts or program modules (i.e., software) running on a computing device (e.g., the computing device described in FIG. 16), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 16, an example computing device 1600 upon which embodiments of the invention may be implemented is illustrated. For example, each of the beverage dispenser 102, server 118, mobile device 122, POS device 124, beverage dispenser 1004, mobile device 1052, POS 1054, and the remote server 1058, described herein may each be implemented as a computing device, such as computing device 1600. It should be understood that the example computing device 1600 is only one example of a suitable computing environment upon which embodiments of the invention may be implemented. Optionally, the computing device 1600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1600 to provide the functionality of a number of servers that is not directly bound to the number of computers in the computing device 1600. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1600 typically includes at least one processing unit 1620 and system memory 1630. Depending on the exact configuration and type of computing device, system memory 1630 may be volatile (such as random access memory (RAM)), non-volatile (such as read-only memory (ROM), flash memory, etc.), or some combination of the two. This most basic configuration is illustrated in FIG. 16 by dashed line 1610. The processing unit 1620 may be a standard programmable processor that performs arithmetic and logic operations necessary for operation of the computing device 1600. While only one processing unit 1620 is shown, multiple processors may be present. Thus, while instructions may be discussed as executed by a processor, the instructions may be executed simultaneously, serially, or otherwise executed by one or multiple processors. The computing device 1600 may also include a bus or other communication mechanism for communicating information among various components of the computing device 1600.

Computing device 1600 may have additional features/functionality. For example, computing device 1600 may include additional storage such as removable storage 1640 and non-removable storage 1650 including, but not limited to, magnetic or optical disks or tapes. Computing device 1600 may also contain network connection(s) 1680 that allow the device to communicate with other devices such as over the communication pathways described herein. The network connection(s) 1680 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1600 may also have input device(s) 1670 such as a keyboard, keypads, switches, dials, mice, track balls, touch screens, voice recognizers, card readers, paper tape readers, or other well-known input devices. Output device(s) 1660 such as a printer, video monitors, liquid crystal displays (LCDs), touch screen displays, displays, speakers, etc. may also be included. The additional devices may be connected to the bus in order to facilitate communication of data among the components of the computing device 1600. All these devices are well known in the art and need not be discussed at length here.

The processing unit 1620 may be configured to execute program code encoded in tangible, computer-readable media. Tangible, computer-readable media refers to any media that is capable of providing data that causes the computing device 1600 (i.e., a machine) to operate in a particular fashion. Various computer-readable media may be utilized to provide instructions to the processing unit 1620 for execution. Example tangible, computer-readable media may include, but is not limited to, volatile media, non-volatile media, removable media, and non-removable media implemented in any method or technology for storage of information such as computer readable instructions, data structures, program modules or other data. System memory 1630, removable storage 1640, and non-removable storage 1650 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1620 may execute program code stored in the system memory 1630. For example, the bus may carry data to the system memory 1630, from which the processing unit 1620 receives and executes instructions. The data received by the system memory 1630 may optionally be stored on the removable storage 1640 or the non-removable storage 1650 before or after execution by the processing unit 1620.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A beverage dispenser, comprising:
a user interface configured to display profile data from a plurality of profiles associated with mobile devices within a predetermined range of the beverage dispenser, wherein the profile data comprises at least one previously selected beverage, and wherein the user interface is configured to receive a selection of a beverage from among the at least one previously selected beverage associated with one of the plurality of profiles;

a nozzle configured to dispense the beverage selected on the user interface;

a plurality of pumping or metering devices, each configured to supply a beverage ingredient from an ingredient source to the nozzle;

a controller configured to operate one or more of the plurality of pumping or metering devices to dispense the beverage selected on the user interface;

a wireless communication device configured to broadcast a device identifier within the predetermined range of the beverage dispenser, wherein the device identifier is a unique identifier of the beverage dispenser; and a memory comprising a profile queue of the plurality of profiles within the predetermined range of the beverage dispenser, wherein the memory further comprises a database of regional profiles comprising a second plurality of profiles within a second range of the beverage dispenser, wherein the second range is greater than the predetermined range.

2. The beverage dispenser of claim 1, wherein a profile from the second plurality of profiles is added to the profile queue upon a mobile device associated with the profile moving from a range within the second range to a range within the predetermined range.

3. The beverage dispenser of claim 1, further comprising:
a second wireless communication device configured to broadcast a second device identifier within the second range of the beverage dispenser.

4. The beverage dispenser of claim 3, wherein the second device identifier is common to a plurality of beverage dispensers.

5. The beverage dispenser of claim 1, further comprising:
a modem configured to receive a notification that a mobile device is within the predetermined range of the beverage dispenser, wherein, in response to the notification, a profile associated with the mobile device is included in the plurality of profiles.

6. The beverage dispenser of claim 5, wherein the modem is further configured to receive a second notification that the mobile device is within a second range of the beverage dispenser, wherein the second range is greater than the predetermined range.

7. The beverage dispenser of claim 6, wherein the modem is further configured to receive the profile associated with the mobile device in response to the second notification.

8. The beverage dispenser of claim 7, wherein the notification and the second notification are received from a server.

9. The beverage dispenser of claim 1, wherein the profile data comprises a profile identifier from each of the plurality of profiles, wherein the profile identifier is selected from the group of profile identifiers consisting of: a name; a screen name; a social media picture; an avatar; and alphanumeric identifier.

* * * * *